United States Patent
Yanagisawa et al.

(10) Patent No.: US 8,616,946 B2
(45) Date of Patent: Dec. 31, 2013

(54) GAME DEVICE, CONTROL METHOD FOR GAME DEVICE, AND INFORMATION STORAGE MEDIUM

(75) Inventors: Takahiro Yanagisawa, Toyko (JP); Zenta Ishida, Tochigi (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 45 days.

(21) Appl. No.: 13/223,464

(22) Filed: Sep. 1, 2011

(65) Prior Publication Data

US 2012/0058829 A1 Mar. 8, 2012

(30) Foreign Application Priority Data

Sep. 2, 2010 (JP) .................................. 2010-197185

(51) Int. Cl.
*A63F 9/24* (2006.01)
*A63F 13/00* (2006.01)

(52) U.S. Cl.
USPC .................................. 463/4; 463/31; 463/43

(58) Field of Classification Search
USPC ............................ 463/24, 30–33, 40–43, 1–5
See application file for complete search history.

(56) References Cited

U.S. PATENT DOCUMENTS

| | | | | |
|---|---|---|---|---|
| 3,874,669 A * | 4/1975 | Ariano et al. | ...................... | 463/4 |
| 5,863,248 A * | 1/1999 | Mine et al. | ...................... | 463/4 |
| 6,149,520 A * | 11/2000 | Takatsuka | ...................... | 463/4 |
| 6,152,821 A * | 11/2000 | Nakagawa et al. | .................. | 463/4 |
| 6,168,519 B1 * | 1/2001 | Nakagawa et al. | ................ | 463/4 |
| 6,558,258 B1 * | 5/2003 | Rupert et al. | .................... | 463/33 |
| 6,676,518 B1 * | 1/2004 | Sawa et al. | ....................... | 463/31 |
| 7,252,588 B2 * | 8/2007 | Takemoto et al. | ................. | 463/4 |
| 7,390,254 B2 * | 6/2008 | Hirai | ................ | 463/4 |
| 7,399,224 B2 * | 7/2008 | Hirai | ................ | 463/4 |
| 7,588,493 B2 * | 9/2009 | Rupert et al. | ...................... | 463/4 |
| 7,927,203 B2 * | 4/2011 | Kimura | .............................. | 463/4 |
| 8,216,037 B2 * | 7/2012 | Terada | ............................. | 463/4 |
| 2002/0183104 A1 * | 12/2002 | Takemoto et al. | ................. | 463/4 |
| 2004/0248631 A1 * | 12/2004 | Hirai | ................ | 463/4 |
| 2004/0259616 A1 * | 12/2004 | Hirai | ................ | 463/4 |
| 2005/0176502 A1 * | 8/2005 | Nishimura et al. | ............. | 463/31 |
| 2008/0085767 A1 * | 4/2008 | Takatsuka | ....................... | 463/32 |
| 2008/0194325 A1 * | 8/2008 | Komuta | ............................ | 463/31 |
| 2009/0305757 A1 * | 12/2009 | Terada | ............................. | 463/4 |
| 2010/0240429 A1 | 9/2010 | Chosogabe | | |
| 2010/0248804 A1 * | 9/2010 | Matsumaru | ....................... | 463/4 |
| 2011/0124386 A1 * | 5/2011 | Kondo et al. | ..................... | 463/4 |

FOREIGN PATENT DOCUMENTS

JP    2009-112406 A    5/2009

* cited by examiner

*Primary Examiner* — Milap Shah
(74) *Attorney, Agent, or Firm* — Sughrue Mion, PLLC

(57) ABSTRACT

A game situation information storage section (71) stores game situation information. A moving destination acquiring section (72) acquires one of a plurality of positions and a plurality of regions in a game space as a plurality of moving destinations to which a game character should be headed. A priority information acquiring section (74) acquires priority information about priorities of the plurality of moving destinations. A determining section (76) determines, while selecting in turn one of the plurality of moving destinations in an order determined based on the priority information, a game character to be moved to the selected one of the plurality of moving destinations from among the plurality of game characters based on a content stored in the game situation information storage section (71). A game character control section (78) controls movements of the plurality of game characters.

13 Claims, 18 Drawing Sheets

| ID | ROLE | ABILITY PARAMETER ||||| 
|---|---|---|---|---|---|---|
| | | RUNNING | PASSING | ... | TACKLING | ... |
| 101 | GK | 60 | 65 | ... | 40 | ... |
| 102 | DF | 70 | 60 | ... | 80 | ... |
| ... | ... | ... | ... | ... | ... | ... |
| 111 | FW | 80 | 75 | ... | 35 | ... |

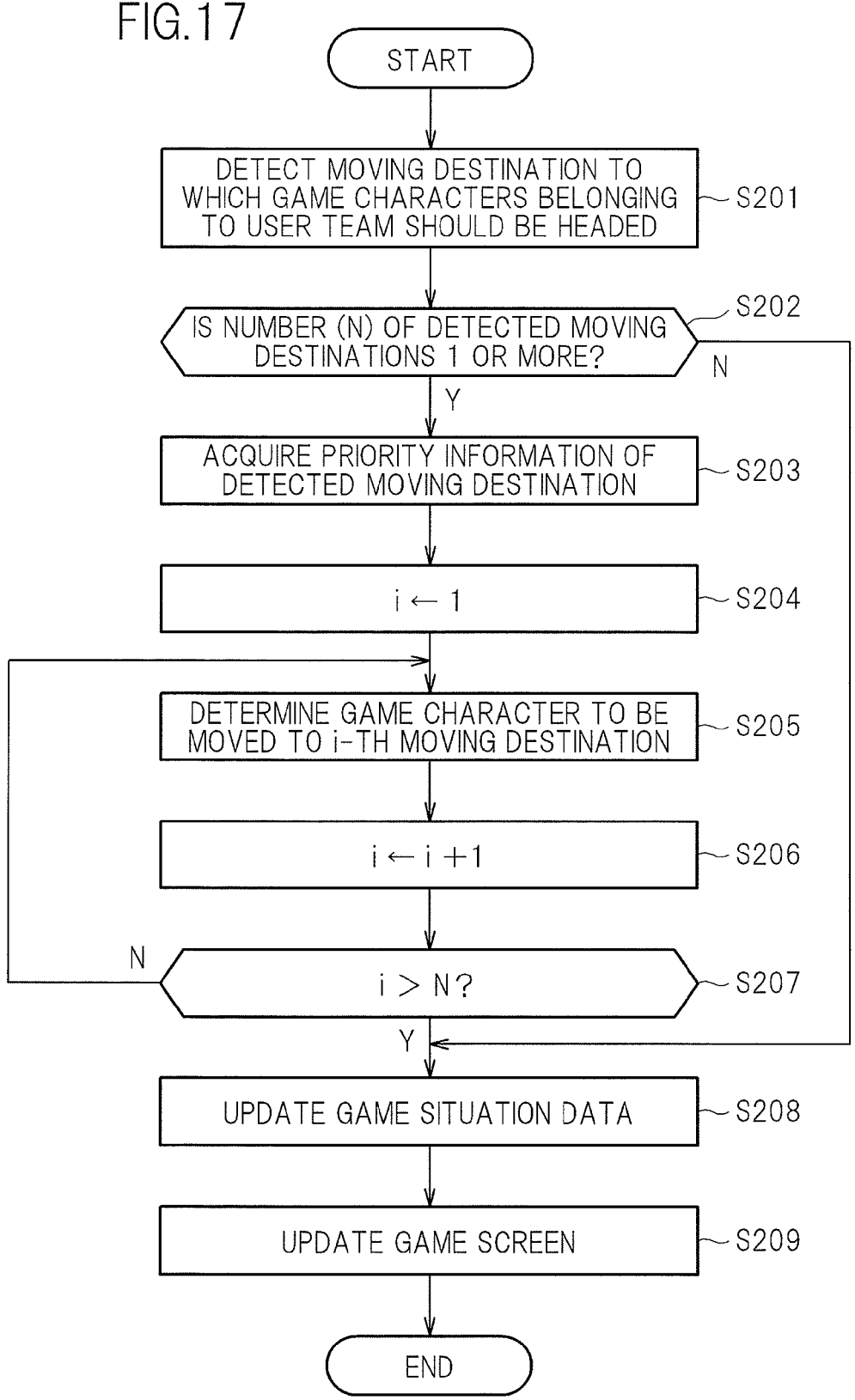

FIG.18

| ID | CONDITION | EVALUATION VALUE |
|---|---|---|
| 1 | · USER TEAM IS IN POSSESSION OF BALL.<br>· BALL IS LOCATED IN FIRST REGION.<br>· MOVING DESTINATION IS LOCATED IN REGION BETWEEN BALL AND GOAL ASSOCIATED WITH OPPONENT TEAM. | +50 |
| 2 | · USER TEAM IS IN POSSESSION OF BALL.<br>· BALL IS LOCATED IN SECOND REGION.<br>· MOVING DESTINATION IS LOCATED IN REGION BETWEEN BALL AND TOUCH LINE. | +50 |
| 3 | · USER TEAM IS IN POSSESSION OF BALL.<br>· BALL IS LOCATED IN THIRD REGION.<br>· MOVING DESTINATION IS LOCATED IN REGION BETWEEN BALL AND GOAL ASSOCIATED WITH USER TEAM. | +50 |
| 4 | · IN LOOSE BALL STATE<br>· DISTANCE BETWEEN POSITION OF MOVING DESTINATION AND BALL IS SMALLER THAN REFERENCE DISTANCE Lp. | +50 |
| 5 | · IN LOOSE BALL STATE<br>· DISTANCE BETWEEN POSITION OF MOVING DESTINATION AND BALL IS EQUAL TO OR LARGER THAN REFERENCE DISTANCE Lp AND SMALLER THAN REFERENCE DISTANCE Lq. | +30 |
| 6 | · IN LOOSE BALL STATE<br>· MOVING DESTINATION IS LOCATED IN MOVING DIRECTION OF BALL. | +20 |
| ... | ... | ... |
| 10 | · ATTACKING ABILITY OF GAME CHARACTER OF USER TEAM THAT IS CLOSEST TO MOVING DESTINATION IS HIGHER THAN REFERENCE. | +20 |
| 11 | · DEFENDING ABILITY OF GAME CHARACTER OF OPPONENT TEAM THAT IS CLOSEST TO MOVING DESTINATION IS HIGHER THAN REFERENCE. | -20 |
| ... | ... | ... |

FIG.19

| ID | CONDITION | EVALUATION VALUE |
|---|---|---|
| 1 | DISTANCE FROM GAME CHARACTER TO MOVING DESTINATION IS SMALLER THAN REFERENCE DISTANCE Lr. | +50 |
| 2 | DISTANCE FROM GAME CHARACTER TO MOVING DESTINATION IS EQUAL TO OR LARGER THAN REFERENCE DISTANCE Lr AND SMALLER THAN REFERENCE DISTANCE Ls. | +20 |
| 3 | ATTACKING ABILITY OF GAME CHARACTER IS EQUAL TO OR LARGER THAN REFERENCE. | +20 |
| 4 | ROLE OF GAME CHARACTER IS FW OR MF. | +20 |
| 5 | GAME CHARACTER BELONGING TO OPPONENT TEAM IS LOCATED ON PATH FROM GAME CHARACTER TO MOVING DESTINATION. | -50 |
| ... | ... | ... |

| ID | TEAMWORK LEVEL PARAMETER |
|---|---|
| 101 | 50 |
| 102 | 65 |
| ... | ... |
| 111 | 80 |

| COMBINATION | TEAMWORK LEVEL PARAMETER |
|---|---|
| 101, 102 | 50 |
| 101, 103 | 70 |
| ... | ... |
| 110, 111 | 90 |

GAME DEVICE, CONTROL METHOD FOR GAME DEVICE, AND INFORMATION STORAGE MEDIUM

CROSS-REFERENCE TO RELATED APPLICATION

The present application claims priority from Japanese application JP 2010-197185 filed on Sep. 2, 2010, the content of which is hereby incorporated by reference into this application.

BACKGROUND OF THE INVENTION

1. Field of the Invention

The present invention relates to a game device, a control method for a game device, and an information storage medium.

2. Description of the Related Art

A game in which a plurality of game characters move in a game space is known. For example, a soccer game in which a plurality of game characters representing soccer players move in a game space is known.

In such a soccer game as described above, for example, when there is a so-called open space (free space), a game character is controlled to move into the open space. However, heretofore, there have been cases where a user may feel that such actions (movements) of the game characters are not performed rationally. For example, there have been cases where a game character that is not suitable for movement into the open space is controlled to move into the open space when there is another game character that is suitable for movement into the open space. For example, there have been cases where "a game character that is suitable for movement into an open space having high importance is controlled to be moved into an open space having low importance, and a game character that is not suitable for movement into the open space having high importance is moved into the open space having high importance."

SUMMARY OF THE INVENTION

The present invention has been made in view of the above-mentioned problem, and an object of the present invention is therefore to provide a game device capable of preventing a user from feeling that actions (movements) of game characters are not performed rationally, a control method for a game device, and an information storage medium.

In order to solve the above-mentioned problem, according to the present invention, there is provided a game device for implementing a game in which a plurality of game characters move in a game space, including: game situation information storage means for storing game situation information about a current situation of the game; moving destination acquiring means for acquiring one of a plurality of positions and a plurality of regions in the game space as a plurality of moving destinations to which a game character should be headed; priority information acquiring means for acquiring priority information about priorities of the plurality of moving destinations acquired by the moving destination acquiring means based on position information about the plurality of positions of the plurality of moving destinations acquired by the moving destination acquiring means; determining means for determining, while selecting in turn one of the plurality of moving destinations acquired by the moving destination acquiring means in an order determined based on the priority information, a game character to be moved to the selected one of the plurality of moving destinations from among the plurality of game characters based on a content stored in the game situation information storage means; and game character control means for controlling movements of the plurality of game characters based on the plurality of moving destinations acquired by the moving destination acquiring means and a result of the determination by the determining means.

Further, according to the present invention, there is provided a control method for a game device for implementing a game in which a plurality of game characters move in a game space, including: a step of acquiring a content stored in game situation information storage means storing game situation information about a current situation of the game; a moving destination acquiring step of acquiring one of a plurality of positions and a plurality of regions in the game space as a plurality of moving destinations to which a game character should be headed; a priority information acquiring step of acquiring priority information about priorities of the plurality of moving destinations acquired in the moving destination acquiring step based on position information about the plurality of positions of the plurality of moving destinations acquired in the moving destination acquiring step; a determining step of determining, while selecting in turn one of the plurality of moving destinations acquired in the moving destination acquiring step in an order determined based on the priority information, a game character to be moved to the selected one of the plurality of moving destinations from among the plurality of game characters based on the content stored in the game situation information storage means; and a game character control step of controlling movements of the plurality of game characters based on the plurality of moving destinations acquired in the moving destination acquiring step and a result of the determination made in the determining step.

Further, according to the present invention, there is provided a program for causing a computer to function as a game device for implementing a game in which a plurality of game characters move in a game space, the program further causing the computer to function as: means for acquiring a content stored in game situation information storage means storing game situation information about a current situation of the game; moving destination acquiring means for acquiring one of a plurality of positions and a plurality of regions in the game space as a plurality of moving destinations to which a game character should be headed; priority information acquiring means for acquiring priority information about priorities of the plurality of moving destinations acquired by the moving destination acquiring means based on position information about the plurality of positions of the plurality of moving destinations acquired by the moving destination acquiring means; determining means for determining, while selecting in turn one of the plurality of moving destinations acquired by the moving destination acquiring means in an order determined based on the priority information, a game character to be moved to the selected one of the plurality of moving destinations from among the plurality of game characters based on the content stored in the game situation information storage means; and game character control means for controlling movements of the plurality of game characters based on the plurality of moving destinations acquired by the moving destination acquiring means and a result of the determination by the determining means.

Further, an information storage medium according to the present invention is a computer-readable information storage medium storing the above-mentioned program.

According to the present invention, it is possible to prevent the user from feeling that the actions (movements) of the game characters are not performed rationally.

Further, according to one aspect of the present invention, the priority information acquiring means may acquire the priority information based on the content stored in the game situation information storage means and the position information of the plurality of moving destinations.

Further, according to one aspect of the present invention, the game may comprise a game simulating a sport match played by using a moving object. The game situation information may contain position information about a position of the moving object and state information about a state of the moving object. The priority information acquiring means may acquire the priority information based on at least one of the position information and the state information of the moving object, and the position information of the plurality of moving destinations.

Further, according to one aspect of the present invention, the game device may include means for storing relationship information about relationships of the plurality of game characters. The determining means may determine, as the game character to be moved to the selected one of the plurality of moving destinations, a plurality of game characters from among the plurality of game characters based on the relationship information and the content stored in the game situation information storage means.

Further, according to one aspect of the present invention, the game character control means may include: means for controlling movement of a game character that is set as an operation subject of a user, of the plurality of game characters, based on an operation by the user; and means for controlling movement of game characters that are not set as the operation subject of the user, of the plurality of game characters, based on the plurality of moving destinations acquired by the moving destination acquiring means and the result of the determination by the determining means. The game device may include guide means for guiding, if the game character that is set as the operation subject of the user is determined as a game character to be moved to one of the plurality of moving destinations, the user in the one of the plurality of moving destinations.

Further, according to one aspect of the present invention, in the game space, a plurality of first game characters corresponding to the plurality of game characters, and at least one second game character may be disposed. The moving destination acquiring means may include: first acquiring means for acquiring moving destinations in the game space to which a first game character should be headed; and second acquiring means for acquiring, under an assumption that one of the plurality of first game characters is not disposed in the game space, the moving destinations to which the first game character should be headed. The moving destination acquiring means may acquire the one of the plurality of positions and the plurality of regions in the game space as the moving destinations to which the first game character should be headed based on results of the acquisition by the first acquiring means and the acquisition by the second acquiring means. The determining means may determine, while selecting in turn one of the plurality of moving destinations acquired by the moving destination acquiring means in the order determined based on the priority information, the game character to be moved to the selected one of the plurality of moving destinations from among the plurality of first game characters based on the content stored in the game situation information storage means. The game character control means may control movements of the plurality of first game characters based on the plurality of moving destinations acquired by the moving destination acquiring means and the result of the determination by the determining means.

BRIEF DESCRIPTION OF THE DRAWINGS

In the accompanying drawings:

FIG. 17 is a flowchart illustrating an example of processing performed by the game device;

FIG. 18 is a view illustrating an example of data for determining the priorities of the moving destinations;

FIG. 19 is a view illustrating an example of data for determining a game character that should be moved to the moving destination;

DETAILED DESCRIPTION OF THE INVENTION

Hereinafter, a detailed description is given of an example of an embodiment of the present invention with reference to the drawings. A game device according to the embodiment of the present invention is implemented by, for example, a consumer game machine (stationary game machine), a portable game machine, a mobile phone, a personal digital assistant (PDA), or a personal computer. Herein, a description is given of a case where the game device according to the embodiment of the present invention is implemented by a consumer game machine.

[Hardware Configuration]

Figure 1:
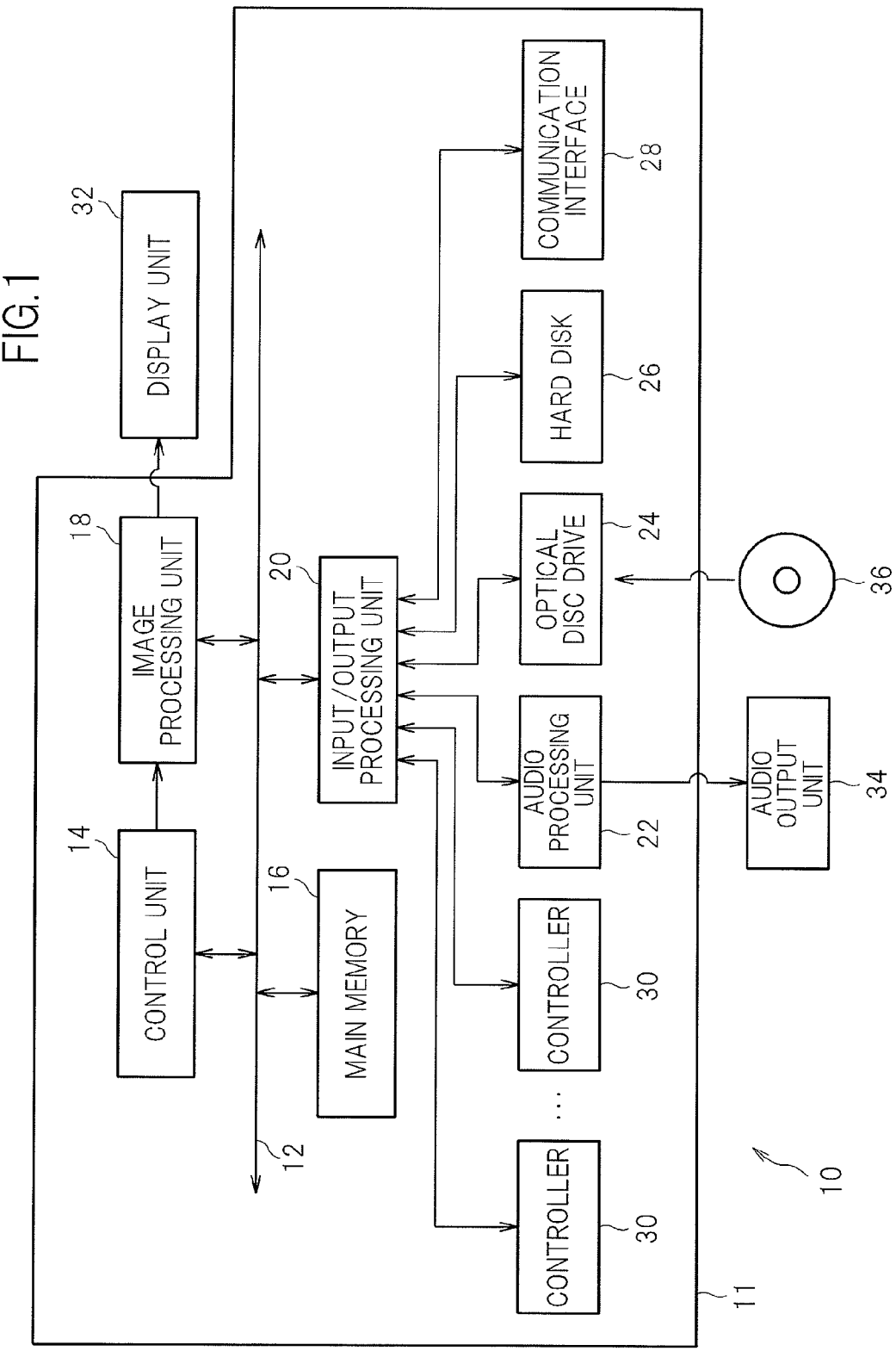
FIG. 1 is a diagram illustrating a hardware configuration of a game device according to an embodiment of the present invention.

FIG. 1 illustrates a hardware configuration of the game device according to this embodiment. As illustrated in FIG. 1, a game device 10 includes a consumer game machine 11, a display unit 32, an audio output unit 34, and an optical disc 36 (information storage medium). The display unit 32 and the audio output unit 34 are connected to the consumer game machine 11. The display unit 32 may be a display device such as a consumer television set or a liquid crystal display, for example. The audio output unit 34 may be an audio outputting device such as a speaker included in the consumer television set or headphones, for example.

The consumer game machine 11 is a known computer game system. The consumer game machine 11 includes a bus 12, a control unit 14, a main memory 16, an image processing unit 18, an input/output processing unit 20, an audio processing unit 22, an optical disc drive 24, a hard disk 26, a communication interface 28, and a controller 30.

The control unit 14 includes one or a plurality of microprocessors. The control unit 14 executes various types of control processing for components and information processing based on a program read from the optical disc 36. The main memory 16 includes, for example, a RAM. The program and data read from the optical disc 36 are written into the main memory 16. The main memory 16 is also used as a working memory for the control unit 14. The bus 12 is used for exchanging addresses and data among the components of the consumer game machine 11.

The image processing unit 18 includes a VRAMs, and renders, based on image data supplied from the control unit 14, a screen on the VRAM. Then, the image processing unit 18 converts the screen rendered on the VRAM into video signals, and outputs the video signals to the display unit 32.

The input/output processing unit 20 is an interface for the control unit 14 to access the audio processing unit 22, the optical disc drive 24, the hard disk 26, the communication interface 28, and the controller 30. The audio processing unit 22 includes a sound buffer, and outputs, from the audio output unit 34, audio data that has been loaded from the optical disc 36 into the sound buffer. The communication interface 28 is an interface for connecting the consumer game machine 11 to a communication network such as the Internet by wire or wireless.

The optical disc drive 24 reads a program or data recorded on the optical disc 36. Herein, the optical disc 36 is used for supplying the program or the data to the consumer game machine 11. Alternatively, another information storage medium, such as a memory card, may be used. Alternatively, the program or the data may be supplied to the consumer game machine 11 from a remote place via a communication network, for example. The hard disk 26 is a commonly-used hard disk device (auxiliary storage device). The program or the data, which is supposed to be stored in the optical disc 36 in the following description, may be stored in the hard disk 26.

The controller 30 is an operation portion for a user to perform operations. A plurality of the controllers 30 may be connected to the consumer game machine 11 by wire or wireless. Each of the controllers 30 includes a plurality of operation members such as, for example, a plurality of buttons and a plurality of levers (sticks). The input/output processing unit 20 scans states of the operation members of the controller 30 at fixed intervals (for example, every $\frac{1}{60}^{th}$ of a second), and then transfers an operation signal indicating a result of the scanning to the control unit 14 via the bus 12. The control unit 14 makes judgment on the user's game operation based on the operation signal.

[Game]

In the game device 10, a game in which a plurality of game characters move in a game space is implemented by the program stored in the optical disc 36. For example, a game simulating a sport match using a moving object (such as a ball or a puck, for example) is implemented. In this game, a sport match is performed between a first game character group and a second game character group.

Hereinafter, a description is given of the case of executing a soccer game which is an example of the above-mentioned sports game. In the soccer game, a soccer match is performed between a team operated by the user (hereinafter, referred to as "user team") and a team operated by an opponent (hereinafter, referred to as "opponent team"). Note that, the opponent may be a computer or another user. Hereinafter, the case where the opponent is a computer is described.

Figure 2:
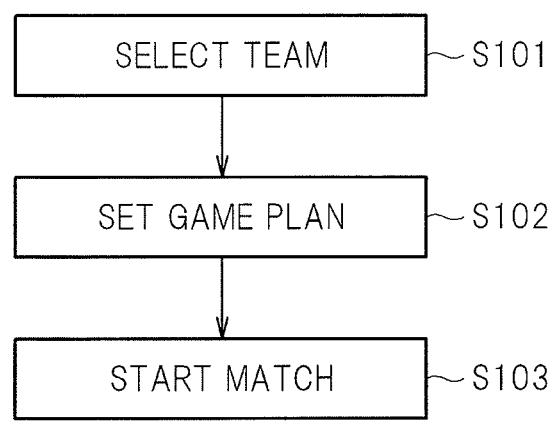
FIG. 2 is a flowchart illustrating an example of a flow of a soccer game.

First, a flow of a soccer game is described. FIG. 2 is a flowchart illustrating an example of the flow of the soccer game. As illustrated in FIG. 2, the user first selects any of a plurality of pre-prepared teams (S101). The team selected in this step is a team operated by the user (specifically, user team).

After the selection of the team, the user sets a game plan of the user team (S102). For example, the user selects any of a plurality of pre-prepared formations to set a formation of the user team. Herein, the "formation" means basic arrangement (basic formation) of the game characters belonging to the team. As the formations selectable by the user, for example, there are formations such as "4-3-3" and "4-4-2". For example, the "4-3-3" formation is made up of a goalkeeper (GK), four defenders (DFs), three midfielders (MFs), and three forwards (FWs).

In addition, the user selects game characters to be assigned to the respective positions (GK, DFs, MFs, and FWs) in the formation. Further, the user selects a strategy to be implemented by the user team. As the types of strategies selectable by the user there are, for example, "counter attack", "side attack", "attack in the middle", and the like.

When the setting of the game plan of the user team is completed, the match is started as illustrated in FIG. 2 (S103). Even after the start of the match, the game plan of the user team can be changed.

Figure 3:
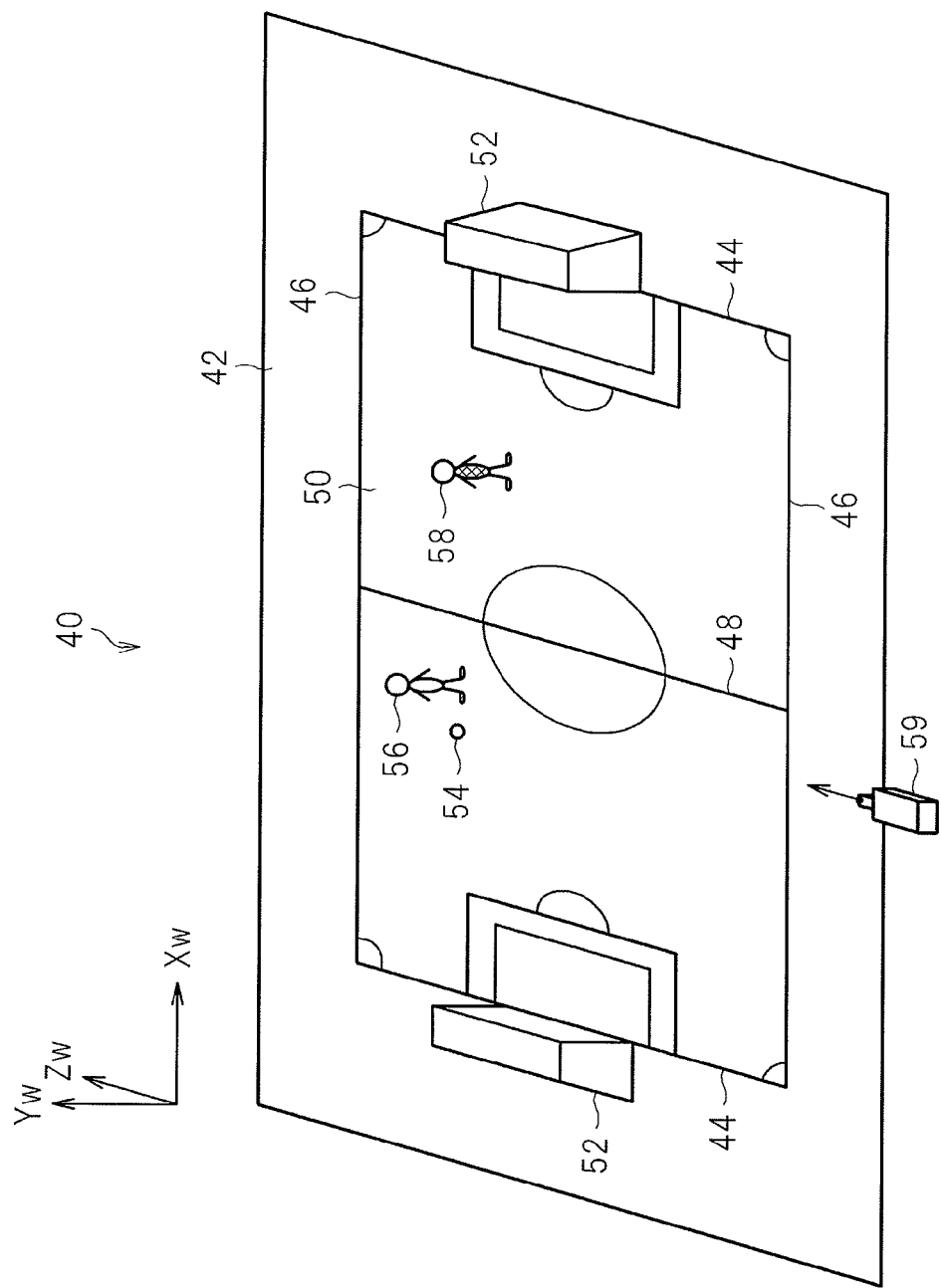
FIG. 3 is a view illustrating an example of a game space.

To start the match, a game space is built in the main memory 16. FIG. 3 illustrates an example of the game space. A game space 40 illustrated in FIG. 3 is a virtual three-dimensional space in which three coordinate axes (an Xw-axis, a Yw-axis, and a Zw-axis) which perpendicularly cross each other are set. The position and the like of an object disposed in the game space 40 is specified by the three coordinate axes.

As illustrated in FIG. 3, in the game space 40, a field 42 corresponding to an object representing a soccer field is disposed. On the field 42, goal lines 44, touch lines 46, a halfway line 48, and the like are drawn. A soccer match is performed on a pitch 50, which is a region surrounded by the two goal lines 44 and the two touch lines 46. The halfway line 48 is a straight line connecting midpoints of the two touch lines 46, and divides the pitch 50 into halves.

In addition, on the field 42, there are disposed goals 52, which are objects representing soccer goals, and a ball 54, which is an object representing a soccer ball. One of the goals 52 is associated with the user team, whereas the other one of the goals 52 is associated with the opponent team. When the ball 54 moves into the goal 52 associated with any one of the teams, a scoring event occurs for the other one of the teams.

In addition, on the field 42, there are disposed a game character 56, which is an object representing a soccer player belonging to the user team, and a game character 58, which is an object representing a soccer player belonging to the opponent team. Eleven game characters 56 belonging to the user team and eleven game characters 58 belonging to the opponent team are disposed, although the illustration thereof is omitted in FIG. 3.

When a game character 56 (58) and the ball 54 come close to each other, the game character 56 (58) and the ball 54 become associated with each other under a predetermined condition. In this case, the moving action of the game character 56 (58) becomes a dribbling action. The state in which the ball 54 is associated with the game character 56 (58) is hereinafter referred to as a state in which "the game character 56 (58) is in possession of the ball 54".

In addition, in the game space 40, a virtual camera 59 (viewpoint) is set. A game screen illustrating a situation of the game space 40, which is viewed from the virtual camera 59, is displayed on the display unit 32. For example, in order to constantly display the ball 54 on the game screen, the virtual camera 59 moves around according to the position of the ball 54.

Figure 4:
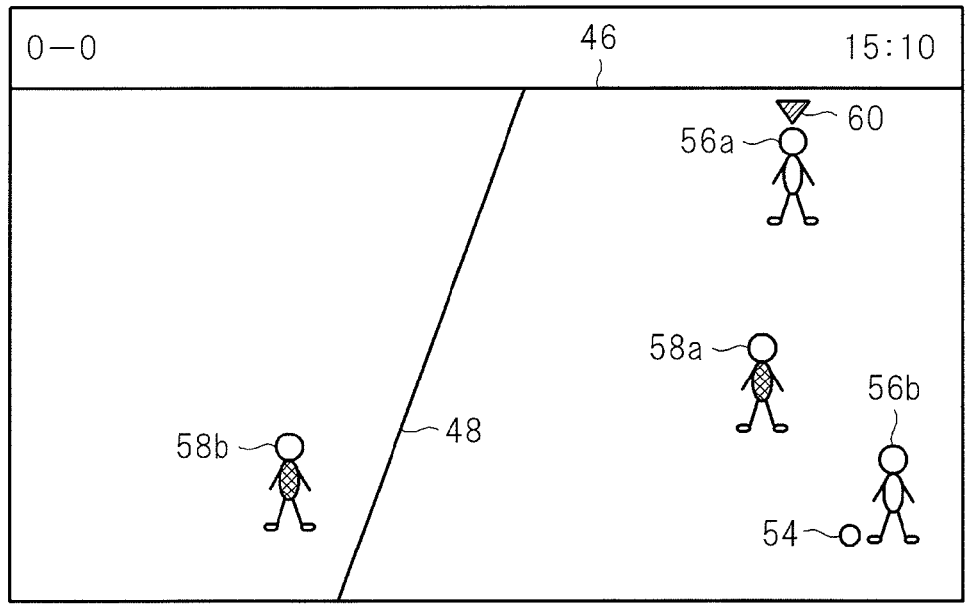
FIG. 4 is a view illustrating an example of a game screen.

FIG. 4 illustrates an example of the game screen during the match. On the game screen illustrated in FIG. 4, two game characters 56*a* and 56*b* belonging to the user team and two game characters 58*a* and 58*b* belonging to the opponent team are displayed.

In the soccer game, any of the game characters 56 belonging to the user team is set as an operation subject of the user. The operation subject of the user is switched between the game characters 56 belonging to the user team. On the game screen illustrated in FIG. 4, a cursor 60 is displayed above a head of the game character 56*a*. The cursor 60 functions to guide the game character 56 set as the operation subject of the user. Note that the operation subject of the user may be fixed to one of the game characters 56.

The game character 56 set as the operation subject of the user acts based on the operation of the user. On the other hand, the game characters 56 which are not set as the operation subject of the user among the game characters 56 belonging to the user team (hereinafter, referred to as "teammate game characters") act autonomously according to artificial intelligence (AI). The game characters 58 belonging to the opponent team also act autonomously according to AI.

Hereinafter, a description is given of technology for preventing, in a game in which a plurality of game characters move in the game space, the user from feeling that the actions (movements) of the plurality of game characters are not performed rationally. Here, a description is made of a technology for preventing, in the above-mentioned soccer game, the user from feeling that the actions (movements) of a plurality of game characters 56 belonging to the user team are not performed rationally.

[Functional Block]

Figure 5:
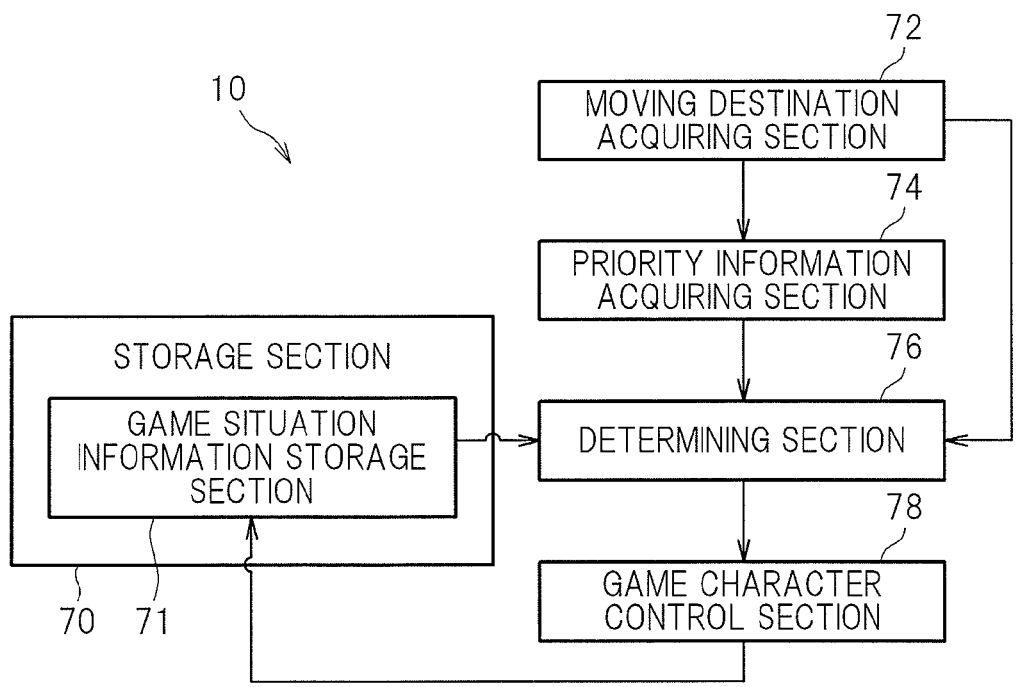
FIG. 5 is a functional block diagram of the game device according to the embodiment of the present invention.

FIG. 5 is a functional block diagram illustrating functions implemented in the game device 10. As illustrated in FIG. 5, the game device 10 functionally includes a storage section 70, a moving destination acquiring section 72, a priority information acquiring section 74, a determining section 76, and a game character control section 78. The storage section 70 is implemented by, for example, the main memory 16 and the optical disc 36, whereas the other functional blocks are implemented by the control unit 14 executing the program read from the optical disc 36.

[Storage Section]

The storage section 70 stores data necessary for the implementation of the game. The storage section 70 includes a game situation information storage section 71. The game situation information storage section 71 stores game situation data for retaining various types of information (game situation information) about the current situation of the game.

For example, the model data of each object disposed in the game space 40 and the motion data of the game characters 56 and 58 are stored in the storage section 70. Further, the storage section 70 stores the following kinds of data.

[A1] User team data
[A2] Opponent team data
[A3] Action control data (AI)
[A4] Game situation data The user team data is data relating to the user team. For example, the user team data contains the following kinds of information.

[A1-1] Game plan information of the user team
[A1-2] Information about the game characters 56 belonging to the user team The game plan information of the user team is information about the game plan of the user team determined by the user in Step S102 of FIG. 2. For example, the game plan information of the user team contains information indicating the formation determined by the user in Step S102 of FIG. 2, and information indicating the strategy determined by the user in Step S102 of FIG. 2.

Figures 6, 7:
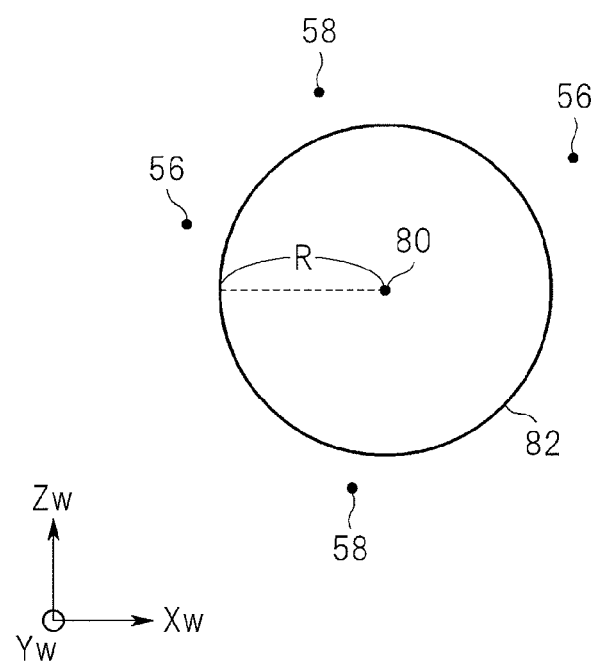
FIG. 6 is a view illustrating an example of game character data.
FIG. 7 is a view illustrating an example of a method of detecting a moving destination to which a game character belonging to a user team should be headed.

The information about the game characters 56 belonging to the user team contains, for example, role information about roles of the game characters 56, and ability information about abilities of the game characters 56. For example, the user team data contains such game character data as illustrated in FIG. 6. The game character data illustrated in FIG. 6 contains an "ID" field, a "role" field, and an "ability parameter" field. The "ID" field indicates information for uniquely identifying the game characters 56. The "role" field indicates the roles played by the game characters 56. In the case of this embodiment, "the roles played by the game characters 56" mean the types of positions (any of FW, MF, DF, and GK) assigned to the game characters 56.

The "ability parameter" field indicates ability parameters of the game characters 56. The ability parameter is information that indicates an ability level in a numerical value ranging, for example, from "0" to "100". As the ability parameter, there are a running-ability parameter, a passing-ability parameter, a shooting-ability parameter, and a tackling-ability parameter. The larger the value of the ability parameter, the higher the ability. Alternatively, the ability parameter may be set so that as the value of the ability parameter becomes smaller, the higher the ability.

The opponent team data is data relating to the opponent team. Similarly to the user team data, the opponent team data retains game plan information of the opponent team and information relating to the game characters 58 belonging to the opponent team.

The action control data is data for controlling actions of teammate game characters. For example, the action control data is data for controlling the teammate game characters to act in accordance with the game plan set by the user. For example, the action control data is artificial intelligence (AI).

The game situation data is the data for retaining the various types of information (game situation information) about the current situation of the soccer game. For example, the following kinds of information are retained in the game situation data.

[A4-1] Position information and state information (for example, moving direction, moving speed, and the like) of each of the game characters 56 and 58

[A4-2] Position information and state information (for example, moving direction, moving speed, and the like) of the ball 54

[A4-3] Score information

[A4-4] Elapsed time information

Note that the state information of the game character 56 (58) is information about the state of the game character 56 (58). The state information of the game character 56 (58) also contains, for example, information indicating whether or not the game character 56 (58) is running, and information indicating whether or not the game character 56 (58) has fallen. The state information of the game character 56 (58) also contains physical condition information about physical conditions of the game character 56 (58). For example, the physical condition information contains information indicating the fatigue degree (or the remaining stamina) of the game character 56 (58) and information indicating presence or absence of an injury and the degree of the injury of the game character 56 (58).

Further, the state information of the game character 56 contains information indicating whether or not the game character 56 is set as an operation subject of the user. The state information of the ball 54 contains information indicating a possession state of the ball 54. Specifically, the state information of the ball 54 contains information indicating whether or not the ball 54 is in possession of any one of the game characters 56 and 58, and information indicating the one of the game characters 56 and 58 that is in possession of the ball 54.

[Moving Destination Acquiring Section]

The moving destination acquiring section 72 acquires a plurality of positions or a plurality of regions in the game space 40 as moving destinations to which the game character 56 should be headed. For example, the moving destination acquiring section 72 acquires the above-mentioned moving destinations based on the positions of the game characters 56 belonging to the user team and the positions of the game characters 58 belonging to the opponent team.

In the case of this embodiment, the moving destination acquiring section 72 detects an open space in the game space 40 (pitch 50) based on the positions of the game characters 56 belonging to the user team and the positions of the game characters 58 belonging to the opponent team. Note that, the "open space" refers to a position or region around which no game character 56 or 58 is located. The moving destination acquiring section 72 determines the detected open space as a moving destination to which the game character 56 belonging to the user team should be headed.

As the method of detecting the moving destination (open space) to which the game character 56 belonging to the user team should be headed, various methods may be employed. For example, as illustrated in FIG. 7, when no game character 56 or 58 is located in a circular region 82 centered on a certain point 80 and having a radius of a predetermined distance R, the circular region 82 is detected as the open space. Then, the above-mentioned point 80 (circular region 82) is determined as the moving destination to which the game character 56 belonging to the user team should be headed.

The method of detecting the moving destination (open space) to which the game character 56 belonging to the user team should be headed is not limited to the above-mentioned method. For example, in the example illustrated in FIG. 7, the circular region 82 is detected as the moving destination (open space) to which the game character 56 belonging to the user team should be headed, and a region having a shape other than the circular shape (for example, elliptical, square, or rectangular shape) may be detected.

Figure 8:
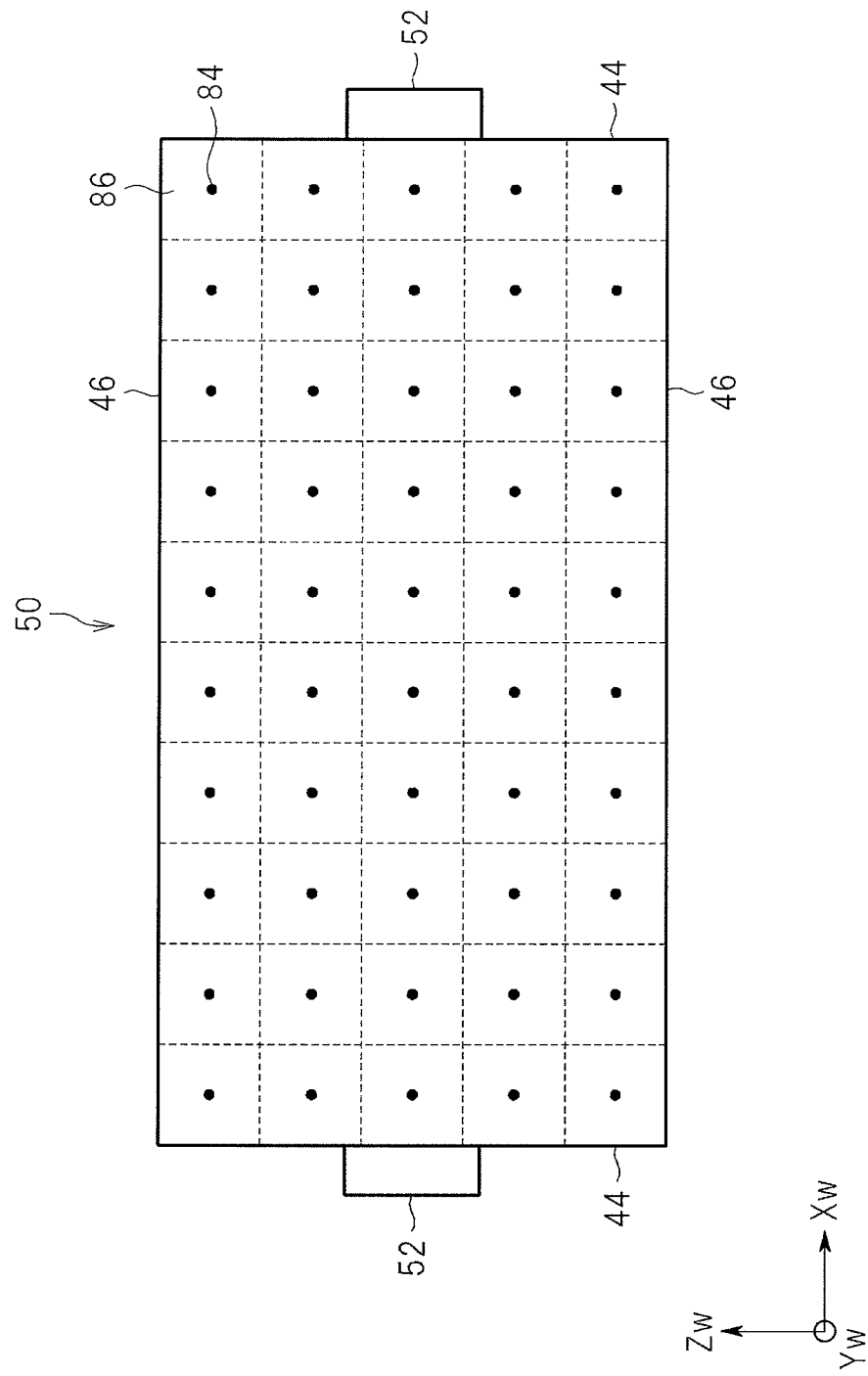
FIG. 8 is a view illustrating another example of the method of detecting the moving destination to which the game character belonging to the user team should be headed.

Alternatively, for example, in a state in which the game character 56 belonging to the user team is in possession of the ball 54, and in a state in which no game character 56 or 58 is in possession of the ball 54 (hereinafter, referred to as "loose ball state"), the moving destination (open space) to which the game character 56 belonging to the user team should be headed may be detected by the method to be described below with reference to FIGS. 8 and 9.

In this detection method, first, a plurality of reference points 84 (sections 86) are set on the pitch 50. In the example illustrated in FIG. 8, the plurality of sections 86 are set on the pitch 50 by dividing the pitch 50 in a vertical direction (direction parallel to the goal lines 44) and a horizontal direction (direction parallel to the touch lines 46). A representative point (center point) of each section 86 corresponds to the reference point 84. Note that in the example illustrated in FIG. 8, the section 86 is a rectangular region (square region) but is not limited to the rectangular region. For example, the section 86 may be a circular region centered on the reference point 84.

Figure 9:
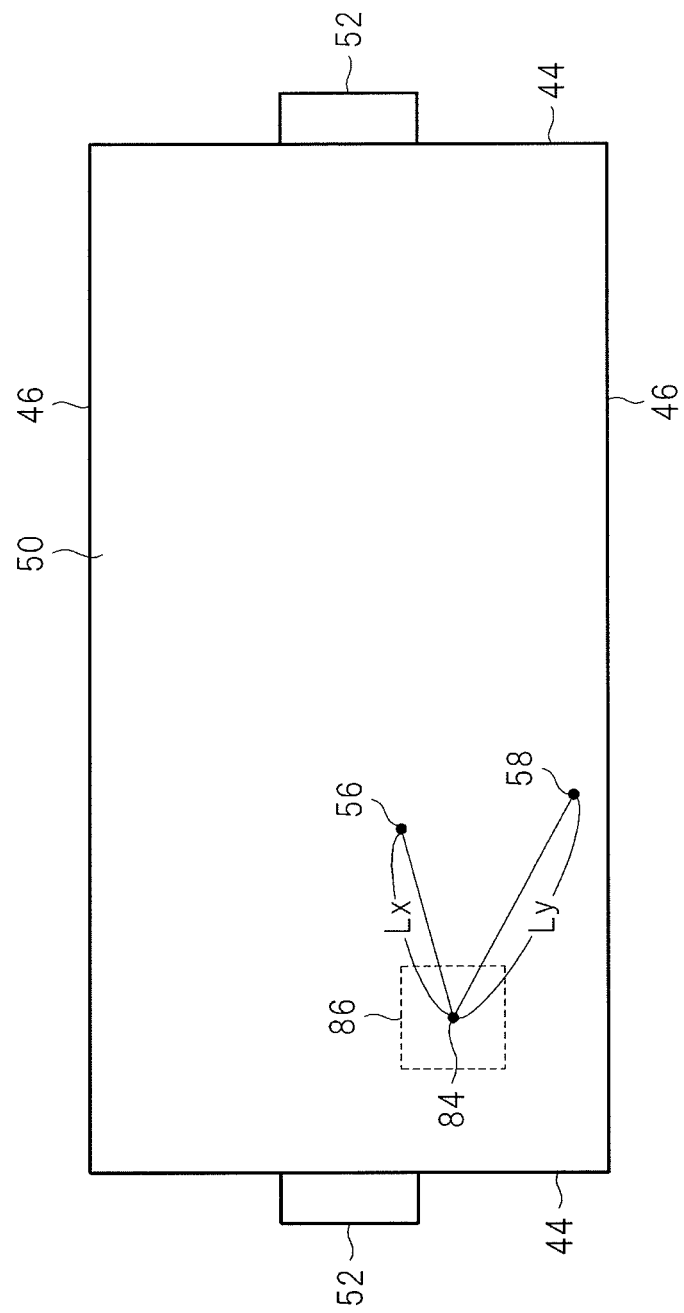
FIG. 9 is a view illustrating a further example of the method of detecting the moving destination to which the game character belonging to the user team should be headed.

Next, from among the plurality of reference points 84 (sections 86), a reference point 84 (section 86) that satisfies both the following two conditions B1 and B2 is detected (see FIG. 9).

[B1] Time Tx required for the game character 56 of the game characters 56 belonging to the user team that is closest to the reference point 84 to move to the reference point 84 is longer than a reference time period.

[B2] The above-mentioned time Tx is shorter than time Ty required for the game character 58 of the game characters 58 belonging to the opponent team that is closest to the reference point 84 to move to the reference point 84.

The above-mentioned time Tx can be calculated based on a distance Lx between the game character 56 and the reference point 84 and the moving speed of the game character 56. Similarly, the above-mentioned time Ty can be calculated based on a distance Ly between the game character 58 and the reference point 84 and the moving speed of the game character 58.

When the reference point 84 satisfies both the above-mentioned conditions B1 and B2, it means that it takes at least the reference time period for the game characters 56 and 58 to reach the reference point 84. In other words, it means that no game character 56 or 58 is located around the reference point 84. In addition, when the reference point 84 satisfies the above-mentioned condition B2, it means that the game character 56 belonging to the user team can reach the reference point 84 faster than the game character 58 belonging to the opponent team.

When the reference point 84 (section 86) that satisfies both the above-mentioned conditions B1 and B2 is detected, the reference point 84 (section 86) is detected as an open space. Then, the reference point 84 (section 86) is set as the moving destination to which the game character 56 belonging to the user team should be headed.

Note that instead of the above-mentioned conditions B1 and B2, the following conditions B1' and B2' may be provided. Then, a reference point 84 (section 86) that satisfies both the following conditions B1' and B2' may be detected (see FIG. 9).

[B1'] The distance Lx from the game character 56 of the game characters 56 belonging to the user team that is closest to the reference point 84 to the reference point 84 is larger than a reference distance.

[B2'] The above-mentioned distance Lx is smaller than the distance Ly from the game character 58 of the game characters 58 belonging to the opponent team that is closest to the reference point 84 to the reference point 84.

Still alternatively, in a state in which the game character 58 belonging to the opponent team is in possession of the ball 54, the moving destination to which the game character 58 belonging to the opponent team should be headed is acquired as the moving destination to which the game character 56 belonging to the user team should be headed. This is because the moving destination to which the game character 58 belonging to the opponent team should be headed is also location to which the game character 56 belonging to the defensive user team should be headed for defense.

In this case, a reference point 84 (section 86) around which no game character 56 or 58 is located and which can be reached by the game character 58 belonging to the opponent team faster than the game character 56 belonging to the user team is detected as the moving destination to which the game character 58 belonging to the opponent team should be headed. For example, a reference point 84 (section 86) that satisfies both the following conditions C1 and C2 is detected.

[C1] Time Ty required for the game character 58 of the game characters 58 belonging to the opponent team that is closest to the reference point 84 to move to the reference point 84 is longer than a reference time period.

[C2] The above-mentioned time Ty is shorter than time Tx required for the game character 56 of the game characters 56 belonging to the user team that is closest to the reference point 84 to move to the reference point 84.

Alternatively, a reference point 84 (section 86) that satisfies both the following conditions C1' and C2' may be detected as the moving destination to which the game character 58 belonging to the opponent team should be headed.

[C1'] The distance Ly from the game character 58 of the game characters 58 belonging to the opponent team that is closest to the reference point 84 to the reference point 84 is larger than a reference distance.

[C2'] The above-mentioned distance Ly is smaller than the distance Lx from the game character 56 of the game characters 56 belonging to the user team that is closest to the reference point 84 to the reference point 84.

[Priority Information Acquiring Section]

The priority information acquiring section 74 acquires priority information about priorities of the plurality of moving destinations acquired by the moving destination acquiring section 72, based on position information about positions of the plurality of moving destinations acquired by the moving destination acquiring section 72, respectively.

Here, an example of a method of determining the priorities of the moving destinations in a case where the game character 56 belonging to the user team is in possession of the ball 54 is described. For example, the priority information acquiring section 74 determines the priority of each of the moving destinations based on the distance between the moving destination and the goal line 44 on the side of the goal 52 associated with the opponent team.

Figure 10:
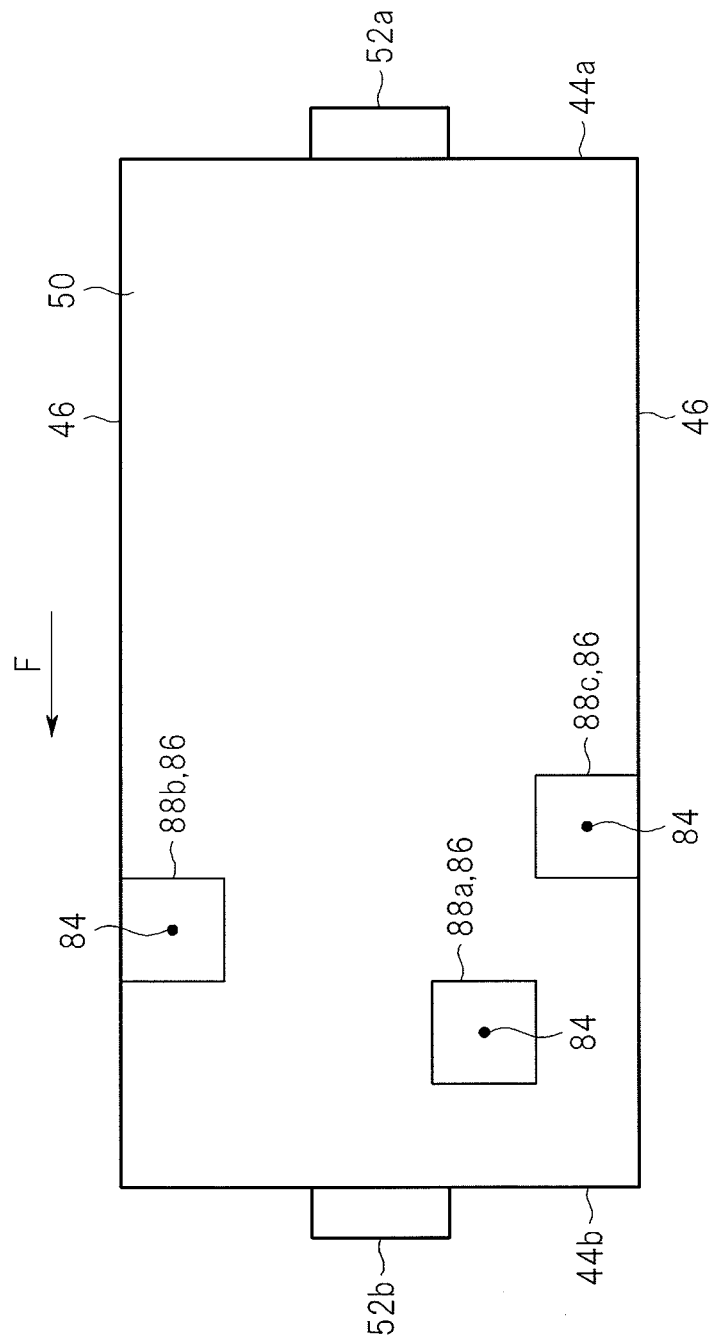
FIG. 10 is a view illustrating an example of a method of determining priorities of moving destinations.
Figure 11:
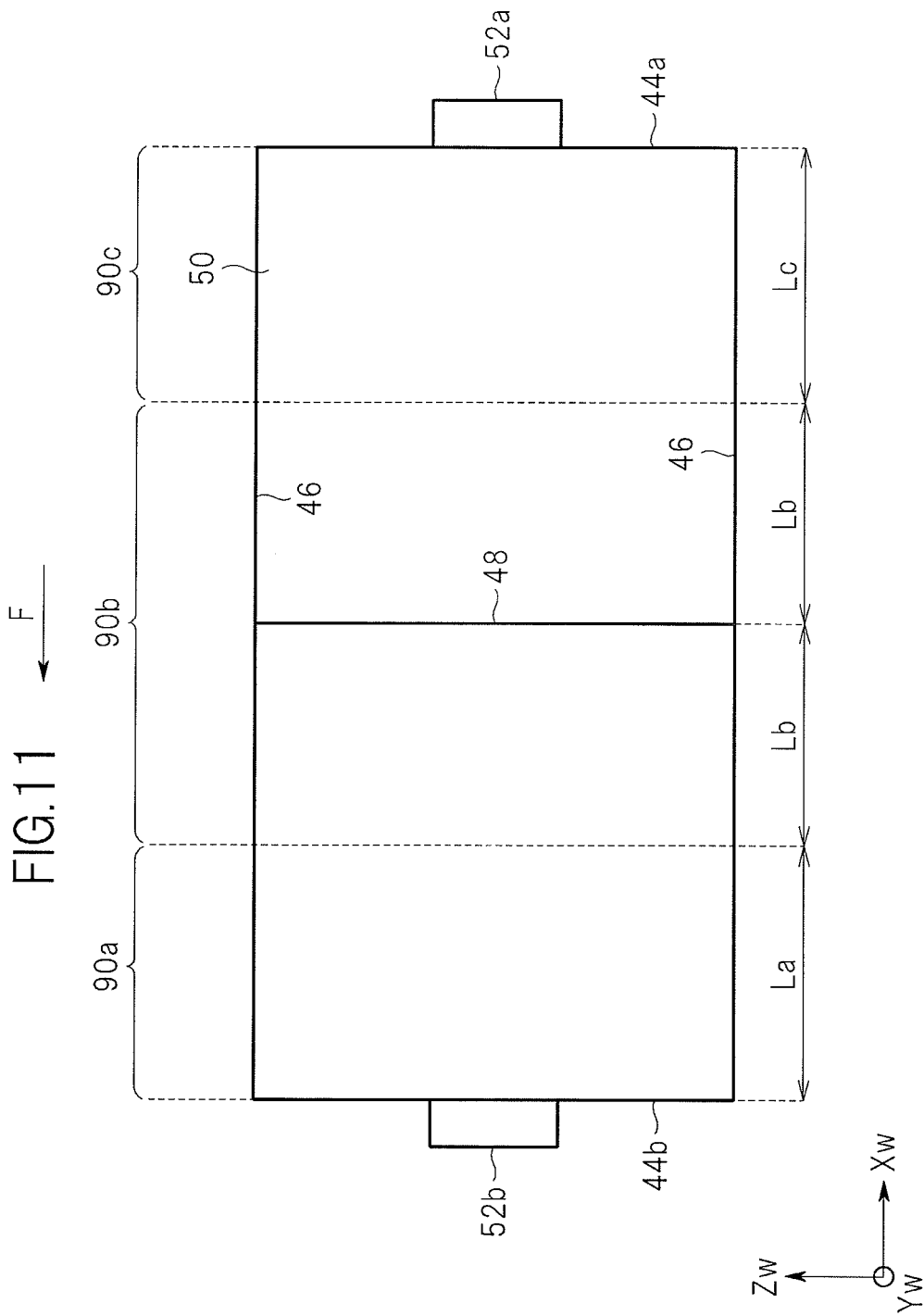
FIG. 11 is a view illustrating another example of the method of determining the priorities of the moving destinations.

FIG. 10 is a view illustrating an example of the method of determining the priorities of the moving destinations in this case. Here, a case is assumed where three sections 86 (reference points 84) that satisfy both the above-mentioned conditions B1 and B2 are acquired as moving destinations 88a, 88b, and 88c by the method described with reference to FIGS. 8 and 9. In addition, in FIG. 10, it is assumed that the user team is attacking in the direction of the arrow F. In other words, a goal 52a is the goal 52 associated with the user team, and a goal 52b is the goal 52 associated with the opponent team.

In the situation illustrated in FIG. 10, the priority of the moving destination 88a having a distance to a goal line 44b on the side of the goal 52b (for example, a length of a perpendicular from the reference point 84 to the goal line 44b) that is the shortest is set higher than those of the other moving destinations 88b and 88c. Also, the priority of the moving destination 88b is set higher than that of the moving destination 88c having the distance to the goal line 44b that is longer than that of the moving destination 88b.

Note that the priority information acquiring section 74 may acquire the above-mentioned priority information based on the game situation information. Alternatively, the priority information acquiring section 74 may acquire the above-mentioned priority information based on some other information.

For example, the priority information acquiring section 74 may acquire the above-mentioned priority information based on the position information about the positions of the plurality of moving destinations acquired by the moving destination acquiring section 72 and at least one piece of the following information D1 to D5.

[D1] The position information and/or the state information of the ball 54

[D2] The position information and/or the ability information of the game character 56 belonging to the user team

[D3] The position information and/or the ability information of the game character 58 belonging to the opponent team

[D4] The game plan information of the user team

[D5] Score information of the user team (1) First, a case where the priorities of the moving destinations are determined based on the above-mentioned information D1 (the position information and/or the state information of the ball 54) is described. For example, the priority information acquiring section 74 determines the priorities of the moving destinations based on the position information of the ball 54.

First, an example of the method of determining the priorities of the moving destinations in the case where the game character 56 belonging to the user team is in possession of the ball 54 is described. In the case where the game character 56 belonging to the user team is in possession of the ball 54, the priority information acquiring section 74 determines the priorities of the moving destinations based on where in the game space 40 the ball 54 is located and a positional relationship between the ball 54 and the moving destinations. The determining method is described with reference to FIGS. 11, 12, 13, and 14. In this case also, it is assumed that the user team is attacking in the direction of the arrow F. In addition, a case is assumed where, in FIGS. 12 to 14, sections 86 (reference points 84) that satisfy the above-mentioned conditions B1 and B2 are acquired as moving destinations 88d, 88e, 88f, 88g, 88h, and 88i to which the game characters 56 belonging to the user team should be headed by the method described with reference to FIGS. 8 and 9.

In this determining method, a plurality of regions are set in the game space 40. In the example illustrated in FIG. 11, three regions (first region 90a, second region 90b, and third region 90c) are set in the pitch 50.

The first region 90a is a region near the goal 52b associated with the opponent team. Specifically, the first region 90a is a region having the distance to the goal line 44b on the side of the goal 52b that is less than a reference distance (La). On the other hand, the third region 90c is a region near the goal 52a associated with the user team. Specifically, the third region 90c is a region having the distance to a goal line 44a on the side of the goal 52a that is less than a reference distance (Lc). Note that "the distance to the goal line 44a (44b)" means, for example, the length of the perpendicular to the goal line 44a (44b).

In addition, the second region 90b is a region near the halfway line 48. Specifically, the second region 90b is a region having the distance to the halfway line 48 that is less than a reference distance (Lb). Note that, "the distance to the halfway line 48" means, for example, a length of a perpendicular to the halfway line 48. In the example illustrated in FIG. 11, the second region 90b is a region other than the first region 90a and the third region 90c.

As described below, the importance of a moving destination (open space) varies depending on where in the game space 40 the ball 54 is located. Therefore, the priority information acquiring section 74 changes the method of determining the priorities of the moving destinations based on which of the plurality of regions (first region 90a, second region 90b, and third region 90c) set in the game space 40 the ball 54 is located in.

Figure 12:
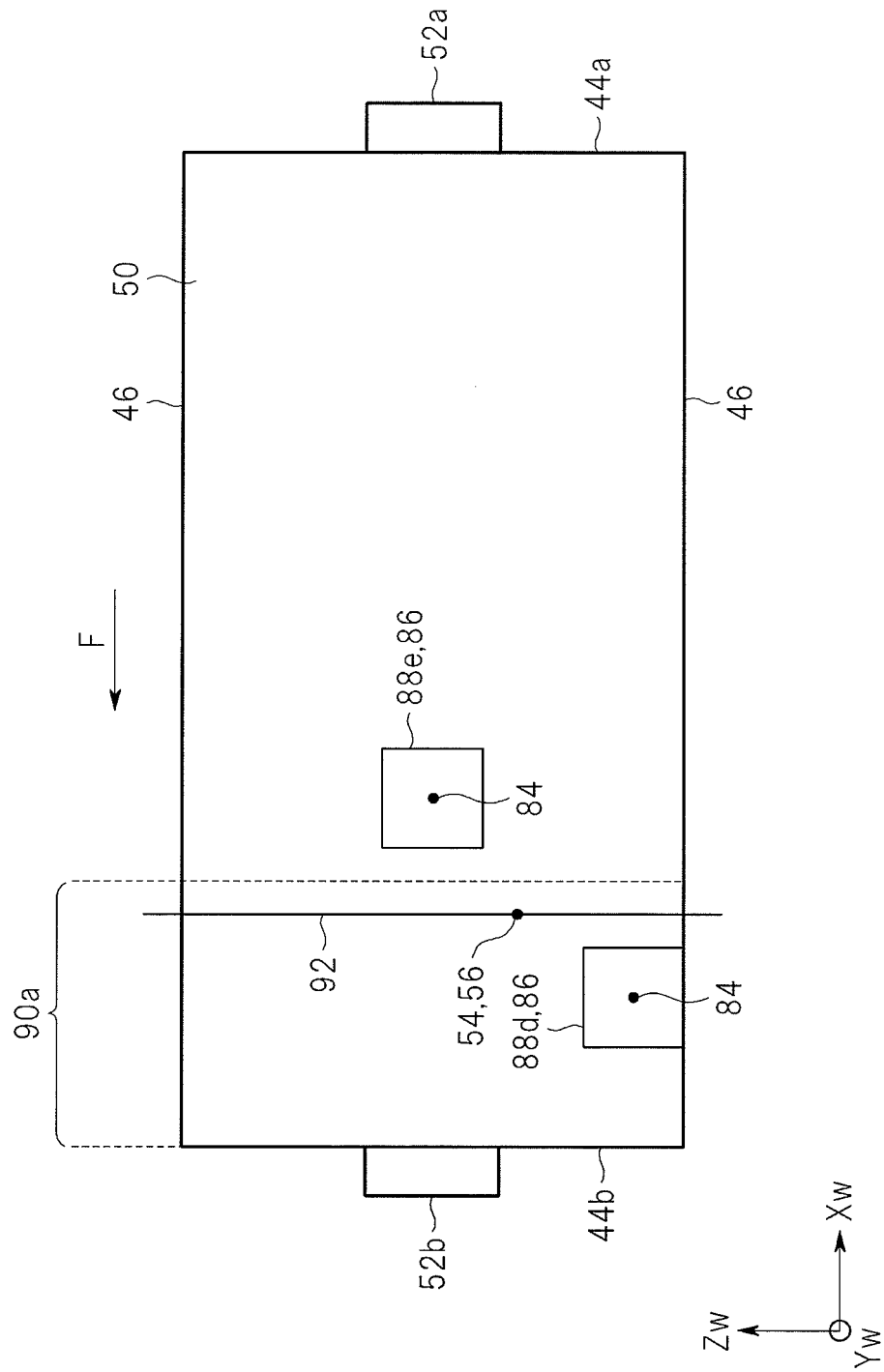
FIG. 12 is a view illustrating a further example of the method of determining the priorities of the moving destinations.

FIG. 12 is a view illustrating the determining method in a case where the ball 54 is located in the first region 90a. Note that a straight line 92 is a straight line which passes through the position of the ball 54 and is parallel to the goal line 44b.

In the case where the ball 54 is located in the first region 90a, the moving destination (open space) on the side of the goal 52b with respect to the position of the ball 54 is important for the user team to play offense. Therefore, in the case where the ball 54 is located in the first region 90a, the priority of the moving destination on the side of the goal 52b (goal line 44b) with respect to the position of the ball 54 is set high. For example, in the situation illustrated in FIG. 12, the priority of the moving destination 88d that is included in a region between the goal line 44b and the straight line 92 is set higher than the priority of the moving destination 88e that is not included in the region between the goal line 44b and the straight line 92.

Figure 13:
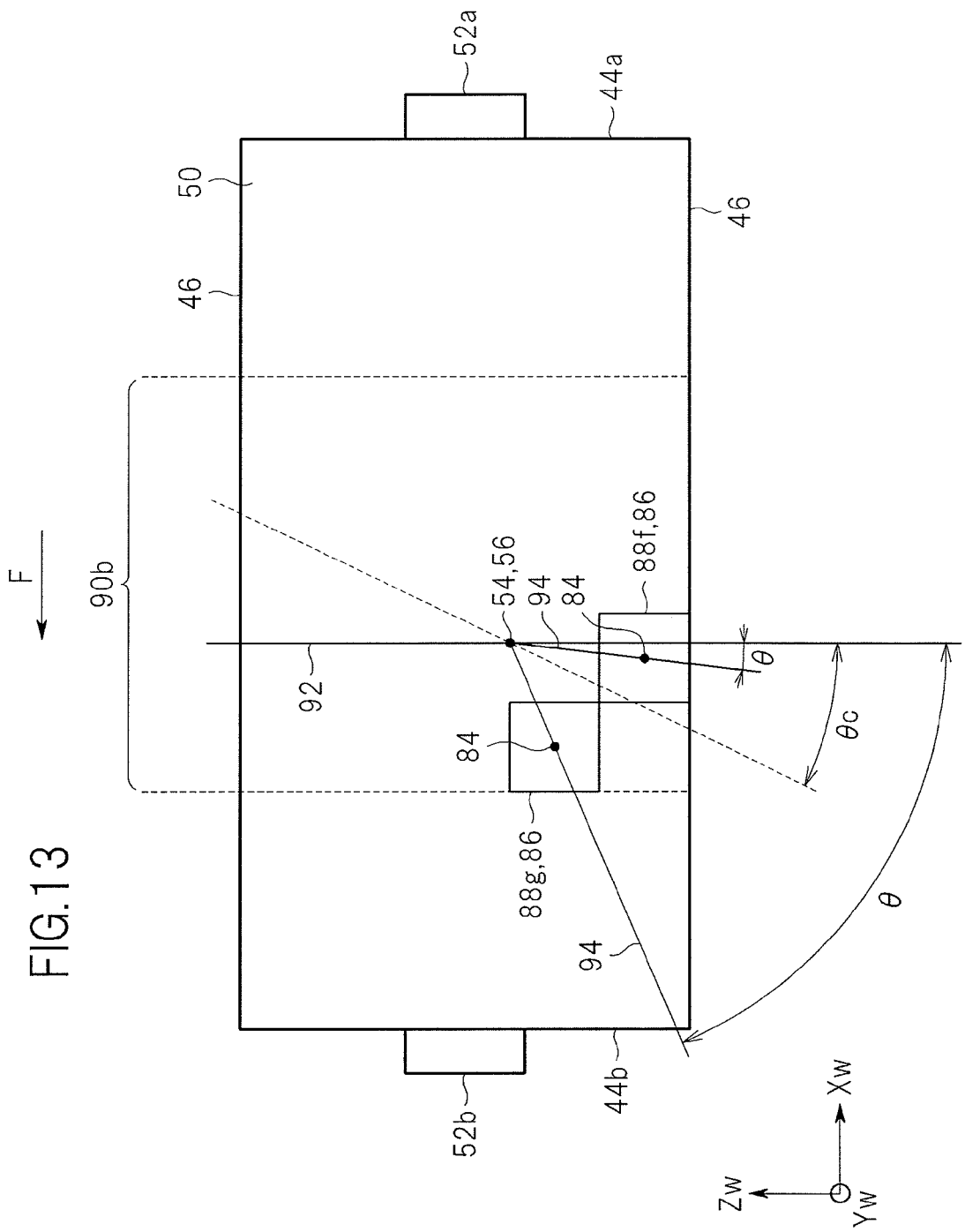
FIG. 13 is a view illustrating a further example of the method of determining the priorities of the moving destinations.

FIG. 13 is a view illustrating the determining method in a case where the ball 54 is located in the second region 90b. Note that a straight line 94 is a straight line which extends in a direction from the position of the ball 54 to the moving destination.

In a case where the ball 54 is located in the second region 90b, the moving destination (open space) between the ball 54 and the touch lines 46 is important. Therefore, in the case where the ball 54 is located in the second region 90b, the priority of the moving destination between the ball 54 and the touch lines 46 is set high. For example, in the situation illustrated in FIG. 13, the priority of the moving destination 88f having an angle θ between the straight lines 92 and 94 that is smaller than a reference angle θc is set higher than the priority of the moving destination 88g having the angle θ between the straight lines 92 and 94 that is not smaller than the reference angle θc.

Figure 14:
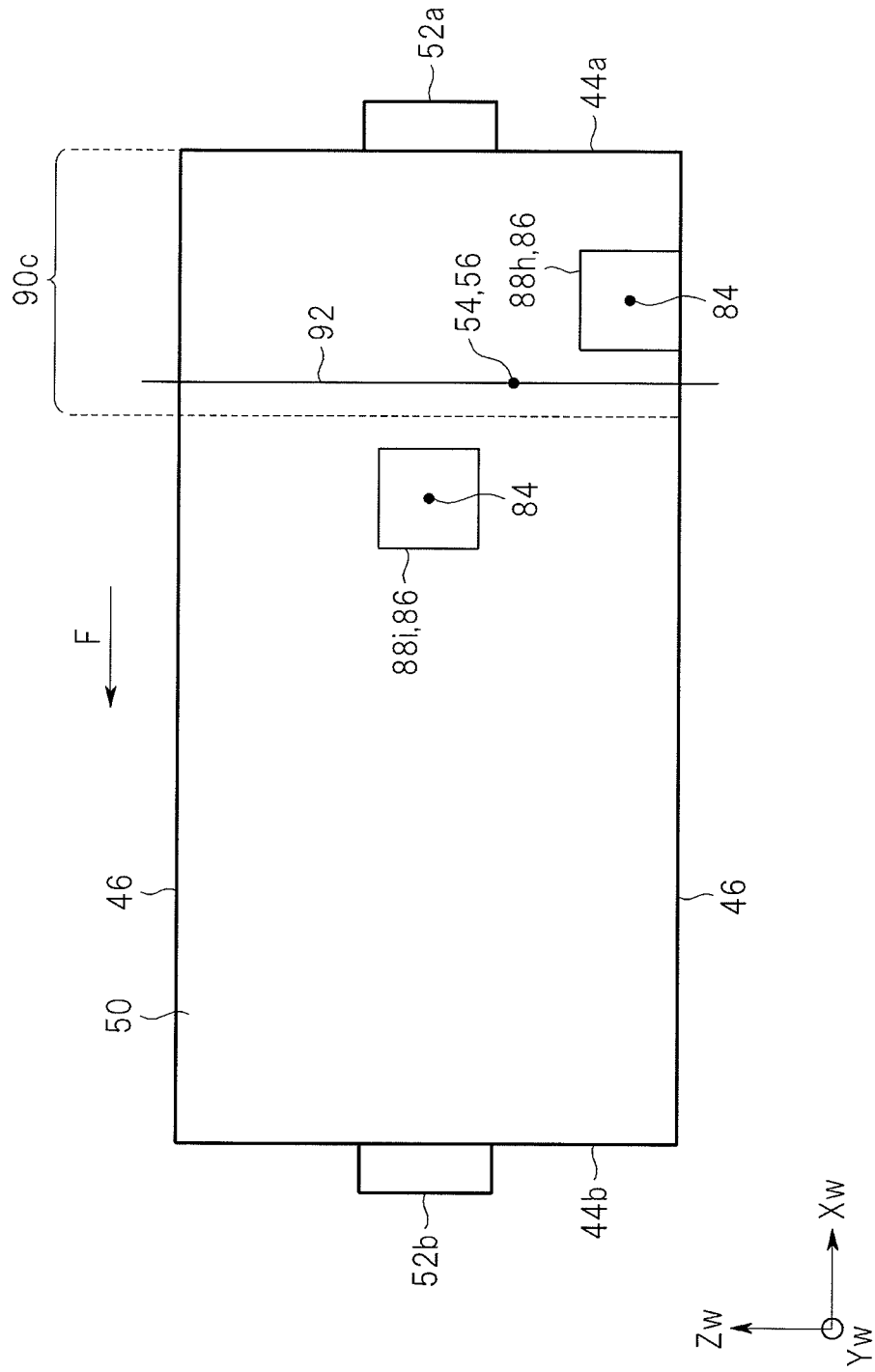
FIG. 14 is a view illustrating a further example of the method of determining the priorities of the moving destinations.

FIG. 14 is a view illustrating the determining method in a case where the ball 54 is located in the third region 90c. In this case, the moving destination (open space) on the side of the goal 52a with respect to the position of the ball 54 is important. Therefore, in the case where the ball 54 is located in the third region 90c, the priority of the moving destination on the side of the goal 52a (goal line 44a) with respect to the position of the ball 54 is set high. For example, in the situation illustrated in FIG. 14, the priority of the moving destination 88h that is included in a region between the goal line 44a and the straight line 92 is set higher than the priority of the moving destination 88i that is not included in the region between the goal line 44a and the straight line 92.

Meanwhile, in a case where any one of the game characters 56 (58) is in possession of the ball 54, the position of the game character 56 (58) that is in possession of the ball 54 can be used instead of the position of the ball 54. Therefore, in the determining method described above, the position information of the game character 56 that is in possession of the ball 54 may be used instead of the position information of the ball 54.

Here, an example of the method of determining the priorities of the moving destinations in the loose ball state is also described with reference to FIG. 15. Note that in FIG. 15, a case is assumed where three sections 86 (reference points 84) satisfying both the above-mentioned conditions B1 and B2 are acquired as moving destinations 88j, 88k, and 88l to which the game characters 56 belonging to the user team should be headed by the method described with reference to FIGS. 8 and 9.

In the loose ball state, the priority information acquiring section 74 determines the priority of each of the moving destinations based on the distance between the moving destination and the ball 54. In the situation illustrated in FIG. 15, the distance between each of the moving destinations 88j and 88k and the ball 54 is shorter than the distance between the moving destination 88l and the ball 54. In such case, the priorities of the moving destinations 88j and 88k are set higher than the priority of the moving destination 88l.

Note that, in a case where the ball 54 is moving, the priority information acquiring section 74 may determine the priorities of the moving destinations based on a moving direction 54a (state information) of the ball 54. For example, the priority of the moving destination that is located near the moving direction 54a of the ball 54 may be set higher than the priority of the moving destination that is not located near the moving direction 54a of the ball 54.

Specifically, the priority information acquiring section 74 may determine the priorities of the moving destinations based on a deviation angle Δθ between the moving direction 54a of the ball 54 and a direction 96 from the ball 54 to the moving destination. In the situation illustrated in FIG. 15, the priority of the moving destination 88j having the above-mentioned deviation angle Δθ that is smaller than that of the moving destination 88k may be set higher than the priority of the moving destination 88k.

Here, the method of determining the priorities of the moving destinations in a case where the game character 58 belonging to the opponent team is in possession of the ball 54 is also described. In the case where the game character 58 belonging to the opponent team is in possession of the ball 54, as described above, the moving destinations to which the game characters 58 belonging to the opponent team should be headed are acquired as the moving destinations to which the game characters 56 belonging to the user team should be headed. Then, in this case, the priorities of the moving destinations are determined so that as the moving destination is more important to the opponent team, the priority becomes higher. More specifically, the priorities of the moving destinations are determined in a method similar to the method described with reference to FIG. 10 or the method described with reference to FIGS. 11 to 14.

Note that in the examples described above, in the case where the game character 56 belonging to the user team is in possession of the ball 54, the priority information acquiring section 74 determines the priorities of the moving destinations by the determining method described with reference to FIGS. 11 to 14. In the loose ball state, the priority information acquiring section 74 determines the priorities of the moving destinations by the determining method described with reference to FIG. 15. Therefore, the priority information acquiring section 74 changes the method of determining the priorities of the moving destinations based on the possession state (state information) of the ball 54.

(2) Next, a case where the priorities of the moving destinations are determined based on the above-mentioned information D2 (the position information and/or the ability information of the game characters 56 belonging to the user team) is described.

For example, the priority information acquiring section 74 determines the priority of each of the moving destinations based on the ability parameters (for example, the ability parameter relating to attacking ability) of the game character 56 of the game characters 56 belonging to the user team that is closest to the moving destination. When the attacking ability of the game character 56 that is closest to the moving destination is high, the moving destination is considered as the moving destination (open space) that is advantageous to the user team. Therefore, when the attacking ability of the game character 56 that is closest to the moving destination is high, the priority of the moving destination is set high. Specifically, in a case where the attacking ability of the game character 56 that is closest to the moving destination is higher than a reference, the priority of the moving destination is set higher than in a case where the attacking ability is lower than the reference.

In addition, for example, in the case where the game character 56 belonging to the user team is in possession of the ball 54, the priority information acquiring section 74 may determine the priority of each of the moving destinations based on the ability parameters (for example, the ability parameter relating to passing ability) of the game character 56 that is in possession of the ball 54. In a case where the passing ability of the game character 56 that is in possession of the ball 54 is low, when the distance between the game character 56 that is in possession of the ball 54 and the moving destination is too long, passing to the moving destination may not be performed correctly. In such case, the moving destination having a long distance from the game character 56 that is in possession of the ball 54 is considered as the moving destination that is not advantageous to the user team. Therefore, for example, in a case where the passing ability of the game character 56 that is in possession of the ball 54 is lower than a reference, the priority of the moving destination that is away from the game character 56 (or the ball 54) that is in possession of the ball 54 by a predetermined distance or more may be set lower than in a case where the passing ability is higher than the reference.

(3) Next, a case where the priorities of the moving destinations are determined based on the above-mentioned information D3 (the position information and/or the ability information of the game characters 58 belonging to the opponent team) is described.

For example, the priority information acquiring section 74 determines the priority of each of the moving destinations based on the ability parameters (for example, the ability parameter relating to defending ability) of the game character 58 of the game characters 58 belonging to the opponent team that is closest to the moving destination. When the defending ability of the game character 58 that is closest to the moving destination is high, the moving destination is considered as the moving destination (open space) that is disadvantageous to the user team. Therefore, when the defending ability of the game character 58 that is closest to the moving destination is high, the priority of the moving destination is set low. Specifically, in a case where the defending ability of the game character 58 that is closest to the moving destination is higher than a reference, the priority of the moving destination is set lower than in a case where the defending ability is lower than the reference.

In addition, for example, the priority information acquiring section 74 may determine whether the moving destination is a moving destination having a high possibility of causing an offside foul based on the positions of the game characters 58 belonging to the opponent team, and determine the priority of the moving destination based on the determination result.

For example, when an offside foul occurs if the ball is passed to the game character 56 belonging to the user team in a state in which the game character 56 is located at the moving destination, the moving destination is determined as "the moving destination having a high possibility of causing an offside foul." In other words, when the moving destination is located in a region between an offside line and the goal line 44 on the side of the goal 52 associated with the opponent team, the moving destination is determined as "the moving destination having a high possibility of causing an offside foul." As used herein, the term "offside line" means a virtual line that passes through the current position of the game character 58 of the game characters 58 belonging to the opponent team that is second closest to the goal line 44 on the side of the goal 52 associated with the opponent team, and is parallel to the goal lines 44.

The moving destination having the high possibility of causing an offside foul is considered as the moving destination that is not advantageous to the user team. Therefore, the priority of the moving destination having a high possibility of causing an offside foul may be set lower than that of the moving destination that does not have a high possibility of causing an offside foul.

(4) Next, a case where the priorities of the moving destinations are determined based on the above-mentioned information D4 (the game plan information of the user team) is described.

For example, the priority information acquiring section 74 sets the priority of the moving destination that is in conformity with the game plan of the user team higher than the priority of the moving destination that is not in conformity with the game plan of the user team. For example, the priority information acquiring section 74 sets the priority of the moving destination that is located in a region corresponding to the game plan of the user team higher than that of the moving destination that is not located in the region corresponding to the game plan of the user team.

For example, the strategy called "side attack" is a strategy of attacking by mainly using regions near the touch lines 46. Therefore, when the strategy of the user team is the "side attack", the priority information acquiring section 74 may set the priorities of the moving destinations located in the regions near the touch lines 46 higher than those of the moving destinations that are not located in the regions near the touch lines 46. As used herein, the phrase "regions near the touch lines 46" refers to, for example, regions having the distance from the touch lines 46 less than a predetermined distance.

Note that, when the strategy of the user team is the "side attack", the priority information acquiring section 74 may determine the priority of each of the moving destinations based on the distance between the touch line 46 and the moving destination. For example, as the moving destination is closer to the touch lines 46, the priority of the moving destination may be set higher. For example, when the moving destinations 88a, 88b, and 88c illustrated in FIG. 10 are acquired, the priorities of the moving destinations 88b and 88c that are closer to the touch lines 46 than the moving destination 88a may be set higher than the priority of the moving destination 88a.

(5) Finally, a case where the priorities of the moving destinations are determined based on the above-mentioned information D5 (score information of the user team) is described.

For example, the priority information acquiring section 74 determines the priorities of the moving destinations based on whether or not the user team is winning the match against the opponent team (that is, whether or not the score of the user team is higher than the score of the opponent team). For example, the priority information acquiring section 74 changes the method of determining the priorities of the moving destinations based on whether or not the user team is winning the match against the opponent team.

For example, when the opponent team is winning the match against the user team, the priority information acquiring section 74 determines the priorities of the moving destinations by the determining method described with reference to FIG. 10. On the other hand, when the user team is winning the match against the opponent team, the priority information acquiring section 74 determines the priorities of the moving destinations by the determining method described with reference to FIGS. 11 to 14. Note that the combination of the determining method used when the opponent team is winning the match against the user team and the determining method used when the user team is winning the match against the opponent team is not limited to that described above.

[Determining Section]

The determining section 76 determines the game character 56 to be moved to the moving destination from among the plurality of game characters 56 based on the game situation information. The determining section 76 determines, while selecting in turn each of the plurality of moving destinations acquired by the moving destination acquiring section 72 in accordance with the order determined based on the priority information acquired by the priority information acquiring section 74, the game character 56 to be moved to the selected moving destination. For example, the determination of the game character 56 to be moved to the moving destination is performed in order from the moving destination having the highest priority.

The determining section 76 determines the game character 56 that is suitable for movement to the moving destination based on the game situation information, to thereby determine the game character 56 to be moved to the moving destination. For example, the determining section 76 determines the game character 56 to be moved to the moving destination based on at least one piece of the following information E1 to E3.

[E1] The position information of the game characters 56 belonging to the user team

[E2] At least one of the ability information, the role information, and the state information of the game characters 56 belonging to the user team

[E3] The position information of the game characters 58 belonging to the opponent team Hereinafter, referring to FIG. 16, an example of the method of determining the game character 56 to be moved to the moving destination is described. Note that in FIG. 16, a case is assumed where two moving destinations 88m and 88n are detected. Here, it is assumed that the priority of the moving destination 88m is higher than the priority of the moving destination 88n. In the situation illustrated in FIG. 16, game characters 56c, 56d, and 56e belonging to the user team and a game character 58c belonging to the opponent team are located near the moving destinations 88m and 88n. The game characters 56c, 56d, and 56e are arranged in order of increasing distance from the moving destination 88m. Also, the game characters 56c, 56e, and 56d are arranged in order of increasing distance from the moving destination 88n. In addition, the game character 58c is located on a straight line 98 connecting the game character 56c and the moving destination 88m.

(1) First, a case where the game character 56 to be moved to the moving destination is determined based on the above-mentioned information E1 (the position information of the game characters 56 belonging to the user team) is described.

For example, the determining section 76 determines the game character 56 to be moved to the moving destination based on the distance between each of the game characters 56 belonging to the user team and the moving destination. The game character 56 having a short distance to the moving destination is considered as the game character 56 that is suitable for movement to the moving destination. Therefore, for example, the determining section 76 selects the game character 56 having the short distance to the moving destination in preference to the game character 56 having a long distance to the moving destination, as the game character 56 to be moved to the moving destination.

Figure 16:
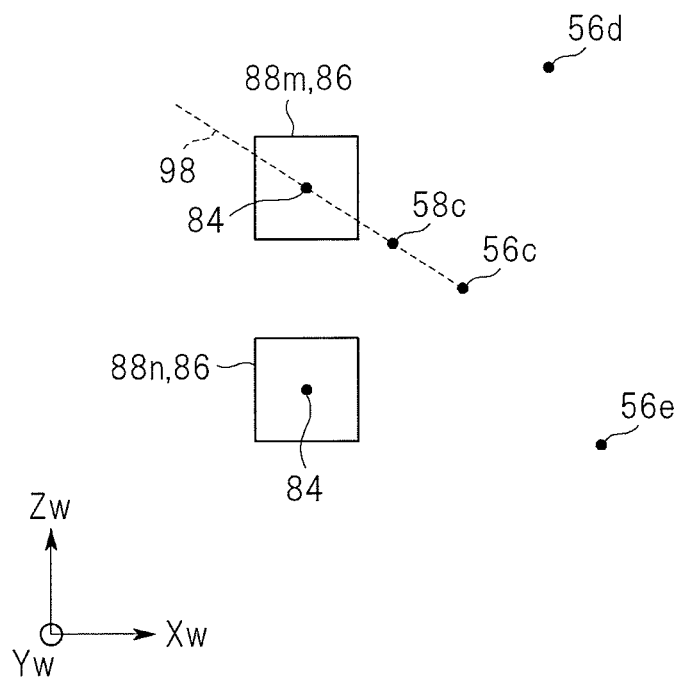
FIG. 16 is a view illustrating a further example of the method of determining the priorities of the moving destinations.

In the situation illustrated in FIG. 16, first, the game character 56 to be moved to the moving destination 88m having the high priority is determined. In this case, the game character 56c of the game characters 56 belonging to the user team that is closest to the moving destination 88m is determined as the game character 56 to be moved to the moving destination 88m.

Next, the game character 56 to be moved to the moving destination 88n is determined. The game character 56 of the game characters 56 belonging to the user team that is closest to the moving destination 88n is the game character 56c. However, the game character 56c is already selected as the game character 56 to be moved to the moving destination 88m. Therefore, the game character 56c is not selected.

Instead, the game character 56e that is closest to the moving destination 88n next to the game character 56c is selected. That is, of the game characters 56 which belong to the user team and are not selected as the game character 56 to be moved to another moving destination, the game character 56e closest to the moving destination 88n is determined as the game character 56 to be moved to the moving destination 88n.

Note that, for example, the determining section 76 may determine the game character 56 to be moved to the moving destination based on the time required for the game character 56 to reach the moving destination. The game character 56 that requires a short time to reach the moving destination is considered as the game character 56 that is suitable for movement to the moving destination. Therefore, for example, the determining section 76 may select the game character 56 that requires the short time to reach the moving destination in preference to the game characters 56 that requires long time to reach the moving destination, as the game character 56 to be moved to the moving destination.

(2) Next, a case where the game character 56 to be moved to the moving destination is determined based on the above-mentioned information E2 (at least one of the ability information, the role information, and the state information of the game characters 56 belonging to the user team) is described.

For example, the determining section 76 selects, from among the game characters 56 belonging to the user team, a plurality of game character 56 as candidates to be moved to the moving destination. The above-mentioned candidates are selected based on, for example, the distance between the position of the game character 56 belonging to the user team and the moving destination. For example, n (where n is an integer of 2 or more) game characters 56 from the game character 56 which is the first closest to the moving destination to an n-th game character 56 which is the n-th closest to the moving destination are selected as the above-mentioned candidates. Alternatively, n (where n is an integer of 2 or more) game characters 56 from the game character 56 that requires the first shortest time to reach the moving destination to the n-th game character 56 that requires the above-mentioned time that is the n-th shortest are selected as the above-mentioned candidates. Note that the game character 56 that is already selected as the game character 56 to be moved to the other moving destination is excluded from the above-mentioned candidates.

For example, when n is 2, in the situation illustrated in FIG. 16, the game characters 56c and 56d are selected as candidates to be moved to the moving destination 88m. Then, the determining section 76 selects any one of the game characters 56c and 56d, which are selected as the candidates, based on at least one of the ability information, the role information, and the state information of the game characters 56c and 56d.

For example, from among the game characters 56c and 56d, the game character 56 having the highest ability (for example, attacking ability) may be selected preferentially. In addition, for example, from among the game characters 56c and 56d, the game character 56 to which a predetermined role (for example, the type of position that is mainly expected to play offense) is assigned may be selected preferentially. More specifically, for example, the game character 56 having the type of position "FW" or "MF" may be selected preferentially.

Further, for example, any one of the game characters 56c and 56d may be selected based on the physical condition information of the game characters 56c and 56d. More specifically, for example, the game character 56 having the lowest fatigue degree (that is, the highest remaining stamina) may be selected preferentially.

Further, for example, when the state of any one of the game characters 56c and 56d is a predetermined state, selection of the game character 56 may be restricted. More specifically, for example, when any one of the game characters 56c and 56d is injured, the game character 56 may be prevented from being selected. Further, for example, when any one of the game characters 56c and 56d has fallen, the game character 56 may be prevented from being selected.

(3) Next, a case where the game character 56 to be moved to the moving destination is determined based on the above-mentioned information E3 (the position information of the game characters 58 belonging to the opponent team) is described.

For example, the determining section 76 determines the game character 56 to be moved to the moving destination based on a moving path in a case where it is assumed that the game character 56 is to be moved to the moving destination, and the positions of the game characters 58 belonging to the opponent team. More specifically, the determining section 76 determines whether or not the game character 58 belonging to the opponent team is located on the moving path in the case where it is assumed that the game character 56 is to be moved to the moving destination, and determines the game character 56 to be moved to the moving destination based on the determination result.

In the situation illustrated in FIG. 16, the game character 56 closest to the moving destination 88m is the game character 56c. However, on the moving path (straight line 98) in the case where the game character 56c is to be moved to the moving destination 88m, the game character 58c belonging to the opponent team is located. In this case, the determining section 76 may prevent the game character 56c from being selected as the game character 56 to be moved to the moving destination 88m.

On the other hand, on the moving path in the case where the game character 56d that is closest to the moving destination 88m next to the game character 56c is to be moved to the moving destination 88m, no game character 58 belonging to the opponent team is located. Therefore, the determining section 76 may select the game character 56d as the game character 56 to be moved to the moving destination 88m.

Note that when the game character 56 to be moved to the moving destination is determined by using the position information of the game characters 58 belonging to the opponent team (above-mentioned information E3), at least one of the ability information, the role information, and the state information of the game characters 58 belonging to the opponent team may be used as well.

For example, in the situation illustrated in FIG. 16, whether or not the game character 56c is selected as the game character 56 to be moved to the moving destination 88m may be determined based on at least one of the ability information, the role information, and the state information of the game character 58c located on the moving path (straight line 98) in the case where the game character 56c is to be moved to the moving destination 88m.

More specifically, for example, in a case where an ability (for example, defending ability) of the game character 58c is lower than a reference, even when the game character 58c is located on the above-mentioned moving path (straight line 98), the game character 56c may be selected. In addition, for example, in a case where the role of the game character 58c is a predetermined role (for example, the type of position that is not much expected to play defense: FW or the like), even when the game character 58c is located on the moving path (straight line 98), the game character 56c may be selected.

In addition, in a case where, for example, the state (for example, the fatigue degree, the remaining stamina, injury, or falling state) of the game character 58c is the predetermined state, even when the game character 58c is located on the above-mentioned moving path (straight line 98), the game character 56c may be selected as the game character 56 to be moved to the moving destination 88m.

For example, in a case where the game character 58c is very tired, even when the game character 58c is located on the above-mentioned moving path (straight line 98), the game character 56c may be selected. Specifically, in a case where the fatigue degree of the game character 58c is higher than a reference (in other words, the remaining stamina of the game character 58c is lower than a reference), even when the game character 58c is located on the above-mentioned moving path (straight line 98), the game character 56c may be selected.

In a case where, for example, the game character 58c is injured, even when the game character 58c is located on the above-mentioned moving path (straight line 98), the game character 56c may be selected. Also, in a case where, for example, the game character 58c has fallen, even when the game character 58c is located on the above-mentioned moving path (straight line 98), the game character 56c may be selected.

(4) Note that, the game character 56 to be moved to the moving destination may be determined based on a plurality of pieces of the above-mentioned information E1 to E3.

[Game Character Control Section]

The game character control section 78 performs control of moving the plurality of game characters 56 based on the plurality of moving destinations acquired by the moving destination acquiring section 72 and the determination result of the determining section 76.

For example, in the situation illustrated in FIG. 16, in a case where the game character 56c is determined as the game character 56 to be moved to the moving destination 88m, the game character control section 78 moves the game character 56c to the moving destination 88m. Similarly, when the game character 56d is determined as the game character 56 to be moved to the moving destination 88n, the game character control section 78 moves the game character 56d to the moving destination 88n.

[Processing]

Next, processing performed in the game device 10 is described. FIG. 17 is a flowchart illustrating an example of processing performed in the game device 10 at predetermined intervals (for example, every $1/60^{th}$ of a second). The control unit 14 performs processing illustrated in FIG. 17 in accordance with a program read out from the optical disc 36. By performing the processing illustrated in FIG. 17, the moving destination acquiring section 72, the priority information acquiring section 74, the determining section 76, and the game character control section 78 are implemented.

As illustrated in FIG. 17, the control unit 14 (moving destination acquiring section 72) detects the moving destination to which the game character 56 belonging to the user team should be headed (S201). For example, the control unit 14 detects one or more open spaces by the method described with reference to FIG. 7 or FIGS. 8 and 9. Then, the control unit 14 determines the detected one or more open spaces as the moving destinations to which the game character 56 belonging to the user team should be headed.

Thereafter, the control unit 14 determines whether or not the number (N) of moving destinations detected in Step S201 is 1 or more (S202). When the number of moving destinations detected in Step S201 is not 1 or more, the control unit 14 performs processing of Step S208 to be described later.

When, on the other hand, the number of moving destinations detected in Step S201 is 1 or more, the control unit 14 (priority information acquiring section 74) acquires the priority information of the one or more moving destinations detected in Step S201 (S203).

In Step S203, the control unit 14 determines the priorities of the moving destinations based on, for example, at least one piece of the above-mentioned information D1 to D5, and the positions of the moving destinations. In Step S203, data for determining the priorities of the moving destinations based on, for example, the at least one piece of the above-mentioned information D1 to D5 and the positions of the moving destinations is read out from the storage section 70. Then, the control unit 14 determines, based on the data, the priorities of the moving destinations.

FIG. 18 illustrates an example of the above-mentioned data. The data illustrated in FIG. 18 contains an "ID" field, a "condition" field, and an "evaluation value" field. The "ID" field stores information for uniquely identifying the condition. The "condition" field stores the condition relating to information used as a basis for determining the priorities of the moving destinations. Specifically, the "condition" field stores conditions relating to the at least one piece of the above-mentioned information D1 to D5 and the positions of the moving destination. Note that hereinafter, the condition having the ID of "n" is referred to as the condition "n".

Note that conditions "1" to "6" of FIG. 18 are conditions relating to the position of the moving destination and the above-mentioned information D1. For example, the moving destination 88d of FIG. 12 satisfies the condition "1". Similarly, the moving destination 88f of FIG. 13 satisfies the condition "2". Also, the moving destination 88h of FIG. 14 satisfies the condition "3".

Figure 15:
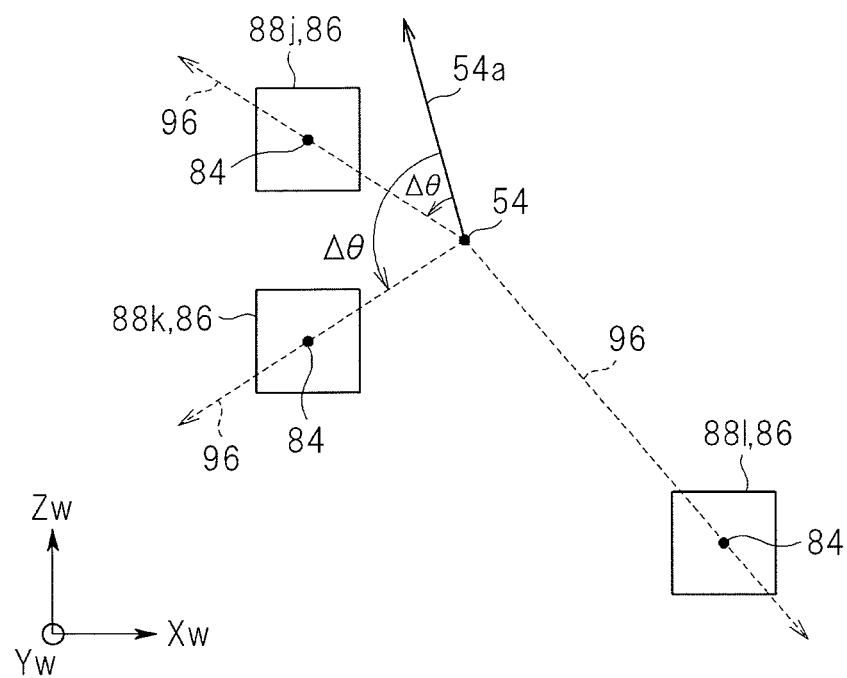
FIG. 15 is a view illustrating a further example of the method of determining the priorities of the moving destinations.

In the situation illustrated in FIG. 15, for example, when the distance between each of the moving destinations 88j and 88k and the ball 54 is smaller than a reference distance Lp, the moving destinations 88j and 88k satisfy the condition "4". Similarly, for example, in the situation illustrated in FIG. 15, when the distance between the moving destination 88l and the ball 54 is equal to or larger than the reference distance Lp and smaller than a reference distance Lq, the moving destination 88l satisfies the condition "5". Also, for example, in the situation illustrated in FIG. 15, when the deviation angle Δθ between the moving direction 54a of the ball 54 and the direction 96 from the ball 54 to the moving destination 88j is smaller than the reference angle, the moving destination 88j satisfies the condition "6".

The condition "10" in FIG. 18 is a condition relating to the position of the moving destination and the above-mentioned information D2, and the condition "11" is a condition relating to the position of the moving destination and the above-mentioned information D3.

The "evaluation value" field stores a numerical value indicating the evaluation level. As the numerical value is larger, it means that the evaluation is higher. Instead, the numerical value may be set so that as the numerical value is smaller, it means that the evaluation is higher.

In Step S203, the control unit 14 calculates the evaluation values of the moving destinations detected in Step S201 based on data illustrated in FIG. 18. Specifically, the control unit 14 determines, for each of the moving destinations detected in Step S201, whether or not the moving destination satisfies each of the conditions defined in the data illustrated in FIG. 18. Then, the control unit 14 calculates the evaluation value of the moving destination based on the evaluation value associated with the condition satisfied by the moving destination.

For example, when the condition "1" is satisfied, the evaluation value of the moving destination is determined based on the evaluation value "+50" associated with a condition ID "1". For example, when only the condition "1" is satisfied, the evaluation value of the moving destination is determined to be "+50". When, for example, two conditions "1" and "10" are satisfied, the evaluation value of the moving destination is determined based on the evaluation value "+50" associated with the condition ID "1" and the evaluation value "+20" associated with the condition ID "10". For example, the sum of the evaluation values, that is "+70", is determined as the evaluation value of the moving destination.

After calculating the evaluation values of the moving destinations detected in Step S201, the control unit 14 determines, based on the calculation result, the priorities of the moving destinations detected in Step S201. For example, the priorities of the moving destinations detected in Step S201 are determined so that the highest priority is given to the moving destination having the highest evaluation.

After the priority information is acquired in Step S203, the control unit 14 (determining section 76) initializes a variable i to 1 (S204), and determines the game character 56 to be moved to the i-th moving destination of the moving destinations detected in Step S201 (S205). As used herein, "the i-th moving destination" is the moving destination that is given the i-th highest priority of the moving destinations detected in Step S201.

For example, the control unit 14 selects, as the game character 56 to be moved to the i-th moving destination, any one of the game characters 56 that satisfy all the following three conditions F1 to F3, based on at least one piece of the above-mentioned information E1 to E3.

[F1] Belonging to the user team.
[F2] Not in possession of the ball 54.
[F3] Not selected as the game character 56 to be moved to another moving destination.

Note that by providing the above-mentioned condition F3, the game character 56 that is already selected as the game character 56 to be moved to any one of the first to (i−1) th moving destination is prevented from being selected as the game character 56 to be moved to the i-th moving destination.

In Step S205, data for determining the game character 56 to be moved to the i-th moving destination based on at least one piece of the above-mentioned information E1 to E3 is read out from the storage section 70. Then, the control unit 14 determines, based on the data, the game character 56 to be moved to the i-th moving destination.

FIG. 19 illustrates an example of the above-mentioned data. The data illustrated in FIG. 19 contains an "ID" field, a "condition" field, and an "evaluation value" field. The "ID" field stores information for uniquely identifying the condition. The "condition" field stores the condition relating to information used as a basis for determining the game character 56 to be moved to the moving destination. Specifically, the "condition" field stores conditions relating to the at least one piece of the above-mentioned information E1 to E3. Note that hereinafter, the condition having the ID of "n" is referred to as the condition "n".

In FIG. 19, the conditions "1" and "2" are conditions relating to the above-mentioned information E1 (the position information of the game character 56 belonging to the user team). The conditions "3" and "4" are conditions relating to the above-mentioned information E2 (at least one of the ability information, the role information, and the state information of the game character 56 belonging to the user team). Further, the condition "5" is a condition relating to the above-mentioned information E3 (the position information of the game character 58 belonging to the opponent team).

The "evaluation value" field stores a numerical value indicating the evaluation level. For example, as the numerical value is larger, it means that the evaluation is higher. Instead, the numerical value may be set so that as the numerical value is smaller, it means that the evaluation is higher.

In Step S205, the control unit 14 calculates the evaluation value of each of the game characters 56 that satisfy the above-mentioned conditions F1 to F3 based on data illustrated in FIG. 19. Specifically, the control unit 14 determines whether or not each of the game characters 56 that satisfy the above-mentioned conditions F1 to F3 satisfies each of the conditions defined in the data illustrated in FIG. 19. Then, the control unit 14 acquires the evaluation value of the game character 56 based on the evaluation value associated with the condition determined to be satisfied by the game character 56. For example, when the game character 56 satisfies the conditions "1", "3", and "4", a total "+90" of the evaluation values associated with the conditions is acquired as the evaluation value of the game character 56.

After calculating the evaluation value of each of the game characters 56 that satisfy the above-mentioned conditions F1 to F3, the control unit 14 determines the game character 56 to be moved to the i-th moving destination based on the calculation result. For example, the game character 56 having the highest evaluation value of the game characters 56 that satisfy the above-mentioned conditions F1 to F3 is determined as the game character 56 to be moved to the i-th moving destination.

After executing the processing of Step S205, the control unit (determining section 76) adds 1 to the variable i (S206) and determines whether or not the value of the variable i is larger than the number (N) of moving destinations detected in Step S201 (S207). Here, a case where the value of the variable i is not larger than N is a case where, for at least one of the moving destinations detected in Step S201, the determination of the game character 56 to be moved to the moving destination is not complete. In this case, the control unit 14 performs the processing of Step S205 again.

On the other hand, a case where the value of the variable i is larger than N is a case where the determination of the game character 56 to be moved to the moving destination is complete for all the moving destinations detected in Step S201. In this case, the control unit 14 updates the game situation data (S208). For example, the control unit 14 updates the position information and the state information of the game character 56 that is set as the operation subject of the user based on an operation signal input from the controller 30. As a result, the game character 56 that is set as the operation subject of the user acts in accordance with the operation by the user.

Also, for example, the control unit 14 (game character control section 78) updates the position information and the state information of the teammate game characters. For example, the control unit 14 moves the teammate game character, which is selected in Step S205 as the game character 56 to be moved to the moving destination detected in Step S201, to the moving destination. In this case, a moving direction of the teammate game character is updated to the direction toward the moving destination. Also, the position of the teammate game character is moved in the moving direction by the distance corresponding to the moving speed. Note that the control unit 14 causes the teammate game characters that are not selected as the game character 56 to be moved to the moving destination detected in Step S201 to act based on the action control data.

In addition, the control unit 14 updates the position information and the state information of the game characters 58 belonging to the opponent team, the position information and the state information of the ball 54, the score information, the elapsed time information, and the like.

Thereafter, the control unit 14 updates the game screen (S209). The control unit 14 creates the game screen (see FIG. 4) representing the game space 40 viewed from the virtual camera 59 on the VRAM based on a content stored in the storage section 70. The game screen created on the VRAM is displayed on the display unit 32. With this, the processing is ended.

[Conclusion]

In the game device 10 described above, for the plurality of moving destinations to which the game characters 56 belonging to the user team should be headed, the determination of the game characters 56 to be moved to the moving destinations is performed in order from the moving destination to which the highest priority is given. According to the game device 10, it is possible to preferentially determine, as the game character 56 to be moved to the moving destination of high importance (priority), the game character 56 that is suitable for movement to the moving destination. As a result, it is possible to avoid a situation in which "the game character 56 that is suitable for movement to the moving destination of high importance is inadequately determined as the game character 56 to be moved to the moving destination of low importance, and the game character 56 that is not suitable for movement to the moving destination of high importance is inadequately determined as the game character 56 to be moved to the moving destination of high importance". Further, according to the game device 10, it is also possible to prevent the plurality of game characters 56 belonging to the user team from moving to one moving destination.

According to the game device 10, it is possible to prevent the user from feeling that the actions (movements) of the game characters 56 are not performed rationally.

MODIFIED EXAMPLE

Note that, the present invention is not limited to the embodiment described above.

Figure 20:
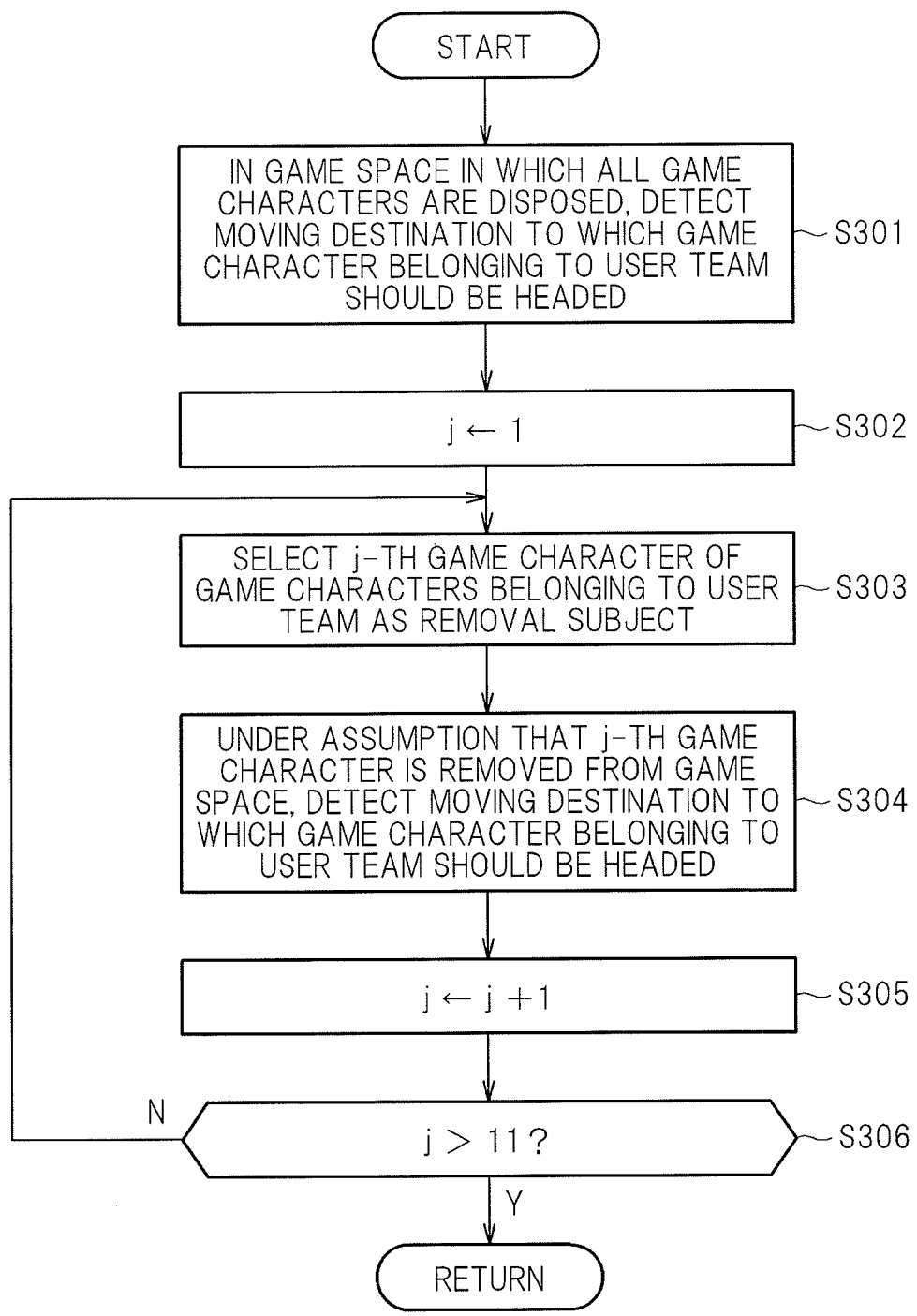
FIG. 20 is a flowchart illustrating another example of the processing performed by the game device.

(1) For example, in Step S201 of FIG. 17, processing illustrated in FIG. 20 may be performed instead of the above-mentioned processing.

In the processing illustrated in FIG. 20, first, the control unit 14 (moving destination acquiring section 72: first acquiring means) detects, in the game space 40 in which all the game characters 56 and 58 are disposed, the moving destination (for example, open space) to which the game character 56 belonging to the user team should be headed (S301). The processing of Step S301 is the same as the processing of Step S201 of FIG. 17.

Thereafter, the control unit 14 detects, while selecting each of the game characters 56 belonging to the user team as a removal subject in turn, under the assumption that the game character 56 selected as the removal subject does not exist in the game space 40, the moving destination (for example, open space) to which the game character 56 belonging to the user team should be headed (S302 to S306).

Specifically, the control unit 14 initializes a variable j to 1 (S302). Thereafter, the control unit 14 sorts the game characters 56 belonging to the user team in some order (for example, ascending or descending order of IDs), and selects the j-th game character 56 of the game characters 56 belonging to the user team as the removal subject (S303).

Then, the control unit 14 (moving destination acquiring section 72: second acquiring means) detects, under the assumption that the j-th game character 56 is removed from the game space 40, the moving destination (for example, open space) to which the game character 56 belonging to the user team should be headed (S304). In Step 304, similar processing to the processing of Step S201 of FIG. 17 is performed on the game space 40 from which the j-th game character 56 is removed.

Thereafter, the control unit 14 adds 1 to the value of the variable j (S305) and determines whether or not the value of the variable j is larger than the number of game characters 56 belonging to the user team, which is 11 (S306). When the value of the variable j is not larger than 11, the control unit 14 performs the processing of Step S303 again.

When, on the other hand, the value of the variable j is larger than 11, the control unit 14 ends this processing and performs the processing of Step S202 of FIG. 17. In this case, the one or more moving destinations detected in Step 301 and the one or more moving destinations detected in Step S304, which has been performed repeatedly, are used as the one or more moving destinations detected in Step S201 of FIG. 17.

For example, when the game character 56 moves from the current position in any direction, the location at which the game character 56 has been located may change to an open space. In view of this, when such processing as described above is performed, the moving destination to which the game character 56 belonging to the user team should be headed may be detected while also considering an open space that may be generated by the movement of the game character 56.

(2) In addition, for example, the determining section 76 may determine the plurality of the game character 56 as the game characters 56 to be moved to one moving destination based on relationship information about the relationship of the game character 56 (for example, teamwork skill or compatibility).

In this case, the storage section 70 stores data holding the relationship information on the relationship between the game character 56 and the other game characters 56. Then, the determining section 76 determines, based on the data, the game character 56 to be moved to the moving destination.

Figures 21, 22, 23:
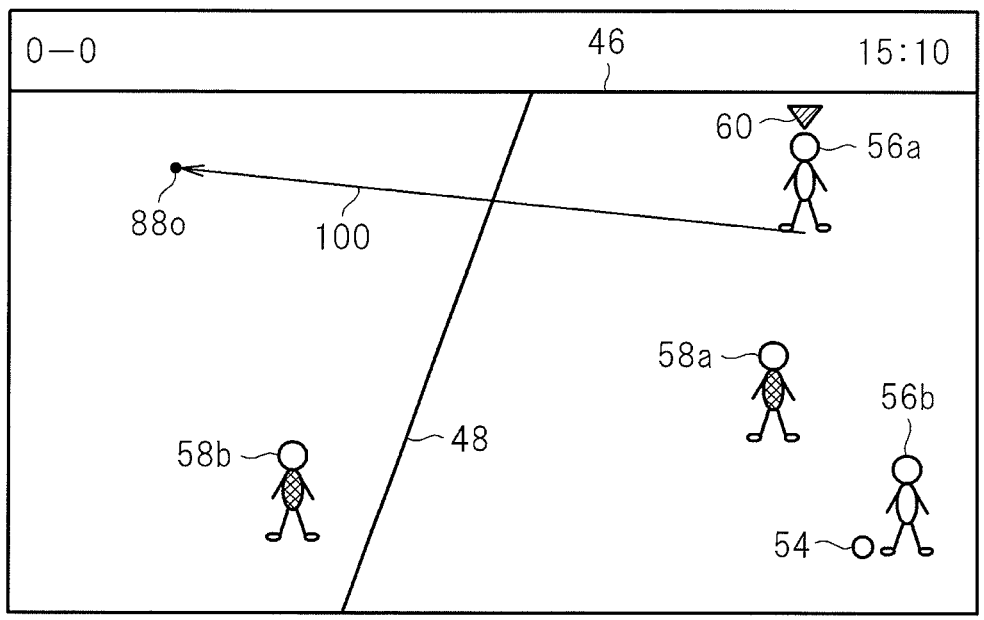
FIG. 21 is a view illustrating an example of data regarding a relationship between game characters.
FIG. 22 is a view illustrating another example of the data regarding the relationship between the game characters.
FIG. 23 is a view illustrating another example of the game screen.

FIG. 21 illustrates an example of the above-mentioned data. The data illustrated in FIG. 21 contains an "ID" field and a "teamwork level parameter" field. The "ID" field indicates information for uniquely identifying the game character 56 belonging to the user team. The "teamwork level parameter" field stores a teamwork level parameter. The teamwork level parameter is numerical information indicating a teamwork level with the other game characters 56. The "teamwork level" means how well a teamwork operation (teamwork play) with the other game characters 56 can be performed. A larger value of the teamwork level parameter means that the teamwork level is higher. Note that the teamwork level parameter may be set so that as the value of the teamwork level parameter becomes smaller, it means that the teamwork level is higher.

In this case, in Step S205 of FIG. 17, first, the control unit 14 selects any one of the game characters 56 that satisfy the above-mentioned conditions F1 to F3 based on at least one piece of the above-mentioned information E1 to E3. For example, after the evaluation value of each of the game characters 56 that satisfy the above-mentioned conditions F1 to F3 is calculated based on the at least one piece of the above-mentioned information E1 to E3 and, for example, such data as illustrated in FIG. 19, the game character 56 having the highest evaluation is selected. Note that hereinafter, the thus-selected game character 56 is referred to as "game character X" for convenience.

After the game character X is selected, the control unit 14 reads out the teamwork level parameter of a game character 56 other than the game character X, of the game characters 56 that satisfy the above-mentioned conditions F1 to F3. For example, the teamwork level parameter of the game character 56 having the second highest evaluation is read out. Note that hereinafter, the game character 56 for which the teamwork level parameter is thus readout is referred to as "game character Y" for convenience.

After reading out the teamwork level parameter of the game character Y, the control unit 14 determines whether or not the value of the read-out teamwork level parameter falls within a predetermined value range. As used herein, the "predetermined value range" is a value range in which the teamwork level can be determined to be low, for example, a range below a reference value. When the value of the read-out teamwork level parameter does not fall within the predetermined value range, that is, when the teamwork level of the game character Y is not low, the control unit 14 selects only the game character X as the game character 56 to be moved to the moving destination.

When, on the other hand, the value of the read-out teamwork level parameter falls within the predetermined value range, that is, when the teamwork level of the game character Y is low, the control unit 14 selects both the game characters X and Y as the game character 56 to be moved to the moving destination. In this case, due to the low teamwork level, a plurality of game characters 56 move to one moving destination.

Then, it is possible to cause the user to realize that, depending on the relationship of the game character 56 belonging to the user team, the teamwork operation among the plurality of game characters 56 is not performed well.

Note that it is also possible to select the game character 56 that is closest to the moving destination, of the game characters 56 that satisfy the above-mentioned conditions F1 to F3, as the above-mentioned game character X. Alternatively, of the game characters 56 that satisfy the above-mentioned conditions F1 to F3, the game character that is second closest to the moving destination may be selected as the above-mentioned game character Y.

Instead of the data illustrated in FIG. 21, data illustrated in FIG. 22 may be stored. The data illustrated in FIG. 22 is data that associates combinations of the game characters 56 and information indicating relationships between the game characters 56.

The data illustrated in FIG. 22 contains a "combination" field and a "teamwork level parameter" field. The "combination" field indicates a combination of two game characters 56 belonging to the user team. The "teamwork level parameter" field stores the teamwork level parameter. The teamwork level parameter indicates the teamwork level between the two game character 56. The "teamwork level" means how well the two game character 56 can perform the teamwork operation (teamwork play). As the value of the teamwork level parameter is larger, it means that the teamwork level is higher. Note that the teamwork level parameter may be set so that as the value of the teamwork level parameter is smaller, it means that the teamwork level is higher.

In this case, the control unit 14 reads out the teamwork level parameter associated with a combination of the above-mentioned game characters X and Y. Then, the control unit 14 determines whether or not the value of the read-out teamwork level parameter falls within a predetermined value range. When the value of the read-out teamwork level parameter does not fall within the predetermined value range, that is, when the teamwork level between the above-mentioned game characters X and Y is not low, the control unit 14 selects only the game character X as the game character 56 to be moved to the moving destination.

When, on the other hand, the value of the read-out teamwork level parameter falls within the predetermined value range, that is, when the teamwork level between the above-mentioned game characters X and Y is low, the control unit 14 selects both the above-mentioned game characters X and Y as the game character 56 to be moved to the moving destination. In this case also, due to the low teamwork level, the plurality of the game characters 56 move to one moving destination.

(3) In the game device 10, there is a case where the game character 56, which is set as the operation subject of the user, is selected as the game character 56 to be moved to the moving destination acquired by the moving destination acquiring section 72. In this case, the control unit 14 (guide means) may guide the user in the moving destination to which the game character 56, which is set as the operation subject of the user, should be headed.

For example, the control unit 14 may display an image indicating the moving destination to which the game character 56, which is set as the operation subject of the user, should be headed on a game screen. FIG. 23 illustrates an example of the game screen in this case. On the game screen illustrated in FIG. 23, an arrow 100 extending from the position of the game character 56a, which is set as the operation subject of the user, to a moving destination 88o (reference point 84) to which the game character 56a should be headed is displayed. This allows the user to relatively easily know the moving destination 88o to which the game character 56a, which is set as the operation subject of the user, should be headed.

Note that the image indicating the moving destination 88o to which the game character 56a, which is set as the operation subject of the user, should be headed is not limited to the arrow 100. For example, a predetermined image (star image) may be displayed at the moving destination 88o to which the game character 56a should be headed.

(4) Further, the game space may be, for example, a two-dimensional game space in which the position of the game character or the like is specified by two coordinate elements.

(5) Further, for example, the present invention is also applicable to another sports game instead of the soccer game. Specifically, the present invention is also applicable to a game simulating a sport (for example, basketball or ice hockey) that is played by using a moving object (such as ball or puck). Further, the present invention is also applicable to another game instead of the sports game. The present invention is applicable to other games, in which a plurality of game characters move in a game space.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for implementing a game in which a plurality of game characters move in a game space, the game device comprising:
   at least one microprocessor configured to:
      acquire, from a storage, game situation information about a current situation of the game;
      acquire a plurality of positions or a plurality of regions in the game space as a plurality of moving destinations;
      acquire priority information about priorities of the plurality of moving destinations based on position information of the plurality of moving destinations;
      determine, while selecting, in turn, each of the plurality of moving destinations in an order determined based on the priority information, a game character to be moved to the selected moving destination from among the plurality of game characters based on the game situation information; and
      control movements of the plurality of game characters based on the plurality of moving destinations and results of the determinations.

2. The game device according to claim 1, wherein the priority information is based on the game situation information and the position information of the plurality of moving destinations.

3. The game device according to claim 2,
   wherein the game comprises a game simulating a sport match played by using a moving object,
   wherein the game situation information contains position information about a position of the moving object and state information about a state of the moving object, and
   wherein the priority information is based on the position information of the plurality of moving destinations and at least one of the position information and the state information of the moving object.

4. The game device according to claim 1, wherein the at least one microprocessor acquires, from the storage, relationship information about relationships of the plurality of game characters,
   wherein the at least one microprocessor determines, as the game character to be moved to the selected moving destination, a plurality of game characters from among the plurality of game characters based on the relationship information and the game situation information.

5. The game device according to claim 1,
   wherein the at least one microprocessor controls movement of a game character that is set as an operation subject of a user, of the plurality of game characters, based on an operation by the user; and controls movement of game characters that are not set as the operation subject of the user, of the plurality of game characters, based on the plurality of moving destinations and the results of the determinations, and
   wherein the at least one microprocessor guides, when the game character that is set as the operation subject of the user is determined as a game character to be moved to one of the plurality of moving destinations, the operation of the user to the one of the plurality of moving destinations.

6. The game device according to claim 1,
   wherein, in the game space, a plurality of first game characters corresponding to the plurality of game characters, and at least one second game character are disposed,
   wherein the at least one microprocessor acquires, in a first acquisition, moving destinations in the game space for a first game character; and acquires, in a second acquisition under an assumption that one of the plurality of first game characters is not disposed in the game space, the moving destinations for the first game character,
   wherein the at least one microprocessor acquires the moving destinations for the first game character based on results of the first acquisition and the second acquisition,
   wherein the at least one microprocessor determines, while selecting, in turn, each of the plurality of moving destinations in the order determined based on the priority information, the game character to be moved to the selected moving destination from among the plurality of first game characters based on the game situation information, and
   the at least one microprocessor controls movements of the plurality of first game characters based on the plurality of moving destinations and the results of the determinations.

7. The game device according to claim 1, wherein the priority information ranks the plurality of moving destinations based on the position information of the plurality of moving destinations relative to features within the game space.

8. The game device according to claim 1, wherein the priority information uniquely ranks from highest priority to lowest priority the plurality of moving destinations based on the position information of the plurality of moving destinations relative to features within the game space.

9. A control method for a game device for implementing a game in which a plurality of game characters move in a game space, the method comprising:
   acquiring, from a storage, game situation information about a current situation of the game;
   acquiring a plurality of positions or a plurality of regions in the game space as a plurality of moving destinations;
   acquiring priority information about priorities of the plurality of moving destinations based on position information of the plurality of moving destinations;
   determining, while selecting, in turn, each of the plurality of moving destinations in an order determined based on the priority information, a game character to be moved to the selected moving destination from among the plurality of game characters based on the game situation information; and
   controlling movements of the plurality of game characters based on the plurality of moving destinations and results of the determinations.

10. A non-transitory computer-readable information storage medium storing a program for causing a computer to function as a game device for implementing a game in which a plurality of game characters move in a game space,
   the program further causing at least one microprocessor of the computer to:
   acquire, from a storage, game situation information about a current situation of the game;
   acquire a plurality of positions or a plurality of regions in the game space as a plurality of moving destinations;
   acquire priority information about priorities of the plurality of moving destinations based on position information of the plurality of moving destinations;
   determine, while selecting, in turn, each of the plurality of moving destinations in an order determined based on the priority information, a game character to be moved to the moving destination from among the plurality of game characters based on the game situation information; and
   control movements of the plurality of game characters based on the plurality of moving destinations and results of the determinations.

11. A game device for implementing a game in which a plurality of game characters move in a game space, the game device comprising:
   means for acquiring, from a storage, game situation information about a current situation of the game;
   moving destination acquiring means for acquiring a plurality of positions or a plurality of regions in the game space as a plurality of moving destinations;
   priority information acquiring means for acquiring priority information about priorities of the plurality of moving destinations based on position information of the plurality of moving destinations;
   determining means for determining, while selecting, in turn, each of the plurality of moving destinations in an order determined based on the priority information, a game character to be moved to the selected moving destination from among the plurality of game characters based on the game situation information; and
   game character control means for controlling movements of the plurality of game characters based on the plurality of moving destinations and results of the determinations.

12. A non-transitory computer-readable information storage medium storing a program for causing a computer to function as a game device for implementing a game in which a plurality of game characters move in a game space,
   the program further causing the computer to function as:
   means for acquiring, from a storage, game situation information about a current situation of the game;
   moving destination acquiring means for acquiring a plurality of positions or a plurality of regions in the game space as a plurality of moving destinations;

priority information acquiring means for acquiring priority information about priorities of the plurality of moving destinations based on position information of the plurality of moving destinations;

determining means for determining, while selecting, in turn, each of the plurality of moving destinations in an order determined based on the priority information, a game character to be moved to the selected moving destination from among the plurality of game characters based on the game situation information; and game character control means for controlling movements of the plurality of game characters based on the plurality of moving destinations and results of the determinations.

13. A non-transitory computer-readable information storage medium storing a program for causing a computer to function as a game device for implementing a game in which a plurality of game characters move in a game space, the program further causing the computer to function as:

a section that acquires, from a storage, game situation information about a current situation of the game;

a moving destination acquiring section that acquires a plurality of positions or a plurality of regions in the game space as a plurality of moving destinations;

a priority information acquiring section that acquires priority information about priorities of the plurality of moving destinations based on position information of the plurality of moving destinations;

a determining section that determines, while selecting, in turn, each of the plurality of moving destinations in an order determined based on the priority information, a game character to be moved to the selected moving destination from among the plurality of game characters based on the game situation information; and a game character control section that controls movements of the plurality of game characters based on the plurality of moving destinations and results of the determinations.

\* \* \* \* \*